United States Patent
Jung et al.

(10) Patent No.: US 10,845,882 B2
(45) Date of Patent: Nov. 24, 2020

(54) METHOD, APPARATUS, AND COMPUTER-READABLE MEDIUM FOR PROVIDING INTERNET BROWSING SERVICE THROUGH TACTILE INTERFACE DEVICE

(71) Applicants: Power Contents Technology Co., Ltd., Seongnam-si (KR); GACHON UNIVERSITY-INDUSTRY FOUNDATION, Seongnam-si (KR)

(72) Inventors: Jung il Jung, Seoul (KR); Jin soo Cho, Seoul (KR)

(73) Assignees: Power Contents Technology Co., Ltd., Seongnam-si (KR); GACHON UNIVERSITY-INDUSTRY FOUNDATION, Seongnam-si (KR)

( * ) Notice: Subject to any disclaimer, the term of this patent is extended or adjusted under 35 U.S.C. 154(b) by 0 days.

(21) Appl. No.: 16/363,697

(22) Filed: Mar. 25, 2019

(65) Prior Publication Data

US 2019/0361528 A1 Nov. 28, 2019

(30) Foreign Application Priority Data

May 28, 2018 (KR) ........................ 10-2018-0060323

(51) Int. Cl.
| | | |
|---|---|---|
| *G06F 3/01* | (2006.01) | |
| *G09B 21/00* | (2006.01) | |
| *G06F 16/958* | (2019.01) | |
| *G06F 9/451* | (2018.01) | |
| *G06F 16/955* | (2019.01) | |
| *G06F 16/953* | (2019.01) | |
| *G06F 40/14* | (2020.01) | |
| *G06F 40/197* | (2020.01) | |

(52) U.S. Cl.
CPC .............. *G06F 3/016* (2013.01); *G06F 9/451* (2018.02); *G06F 16/953* (2019.01); *G06F 16/9562* (2019.01); *G06F 16/986* (2019.01); *G06F 40/14* (2020.01); *G06F 40/197* (2020.01); *G09B 21/004* (2013.01)

(58) Field of Classification Search
CPC ....... G06F 3/016; G06F 16/953; G06F 40/197
See application file for complete search history.

(56) References Cited

U.S. PATENT DOCUMENTS

2002/0129164 A1 * 9/2002 Van Der Meulen .... H04L 67/02
709/239
2008/0301127 A1 * 12/2008 Gilmer .................. G06F 16/951
(Continued)

*Primary Examiner* — David E Choi
(74) *Attorney, Agent, or Firm* — Studebaker & Brackett PC

(57) ABSTRACT

The present invention relates to a method, an apparatus, and a computer-readable medium for providing an internet browsing service through a tactile interface device, and more particularly, to a method, an apparatus, and a computer-readable medium for providing an internet browsing service through a tactile interface device, which allow a visually impaired person to intuitively use, interact, and control the tactile interface device that corresponds to a multi-array tactile cell-based smart braille device in order to increase the efficiency of the use of a smart device (smart phone, smart pad, etc.) or a smart braille device and to improve the level of informatization of the visually impaired person, so that the visually impaired person may intuitively use the content of a web page.

8 Claims, 27 Drawing Sheets

(56) References Cited

U.S. PATENT DOCUMENTS

| | | | |
|---|---|---|---|
| 2013/0029297 A1* | 1/2013 | Tsai | G09B 21/003 434/114 |
| 2013/0046771 A1* | 2/2013 | Moitra | G06Q 50/26 707/749 |
| 2013/0110601 A1* | 5/2013 | Sugiura | G06Q 30/0224 705/14.16 |
| 2013/0268832 A1* | 10/2013 | Vemireddy | G06F 16/9562 715/206 |
| 2014/0253687 A1* | 9/2014 | Lee | G06F 3/0488 348/46 |
| 2015/0161277 A1* | 6/2015 | Heller | G06F 9/44526 715/229 |
| 2015/0339386 A1* | 11/2015 | Yang | H04L 67/02 707/706 |
| 2016/0232817 A1* | 8/2016 | Djugash | G09B 21/02 |
| 2019/0361528 A1* | 11/2019 | Jung | G06F 3/016 |

* cited by examiner

FIG. 20A

| | Braille | 📶 PM3:57 Gachon Univ. |
|---|---|---|
| ① | 1 | Internet braille browser |
| | 2 | Braille image viewer |
| | 3 | Clock |
| | 4 | Calculator |
| | 5 | Text editor |
| | 6 | Notepad |
| | 7 | Daisy reader |
| | 8 | Epub reader |
| | 9 | Configuration |
| | 1/1 | |

FIG. 20B

| | Internet Browser | 📶 PM3:57 Gachon Univ. |
|---|---|---|
| ③ | 1 | Bookmark List |
| | 2 | Google Search |
| | 3 | Naver Search |
| | 4 | Yahoo Search |
| | 5 | add site |
| | 6 | add site |
| ② | 1/1 Main | |

METHOD, APPARATUS, AND COMPUTER-READABLE MEDIUM FOR PROVIDING INTERNET BROWSING SERVICE THROUGH TACTILE INTERFACE DEVICE

CROSS-REFERENCE TO RELATED APPLICATION

This application claims priority to Korean Patent Application No. 10-2018-0060323 filed May 28, 2018 with the Korean Intellectual Property Office, the contents of which are incorporated herein by reference.

BACKGROUND OF THE INVENTION

1. Field of the Invention

The present invention relates to a method, an apparatus, and a computer-readable medium for providing an internet browsing service through a tactile interface device, and more particularly, to a method, an apparatus, and a computer-readable medium for providing an internet browsing service through a tactile interface device, which allow a visually impaired person to intuitively use, interact, and control the tactile interface device that corresponds to a multi-array tactile cell-based smart braille device in order to increase the efficiency of the use of a smart device (smart phone, smart pad, etc.) or a smart braille device and to improve the level of informatization of the visually impaired person, so that the visually impaired person may intuitively use the content of a web page.

2. Description of the Related Art

In the information society, it is essential to acquire and utilize information by using a computer, and such a trend is the same for visually impaired people as well as ordinary people.

In order to improve the level of informatization of the visually impaired people, it is necessary to enable the visually impaired people to acquire and utilize information at a level similar to that of the ordinary people, which is important in that daily lives of the visually impaired people can be more convenient, and the visually impaired people can acquire and utilize the information for themselves. In addition, ultimately, it may be very important in that the visually impaired people are provided with various educational opportunities to expand opportunities for entering and participating in the society, so that their welfare can be further improved.

However, a current general way to use a computer is mainly to visually recognize visual information outputted through a monitor and input information for the visual information by using an input tool such as a keyboard, a mouse, or a touch pad. Accordingly, there is a huge limitation to the visually impaired people who cannot use a vision in recognizing output information of the computer and performing an instant interaction such as information input for the output information at a level the same as that of the ordinary people. As a result, the visual impairment significantly reduces the efficiency in using the computer, thereby greatly depriving the visually impaired people of the opportunity to acquire and utilize the information through the computer.

In order to solve the difficulty in using the computer of the visually impaired people, various technologies have been developed to recognize the visual information and interact with the computer by using a hearing sense, a tactile sense, etc. As a representative technology, there is a screen reader which aids the visually impaired people to use the computer through the hearing sense. The screen reader is a device or software for enabling the use of the computer by outputting, with a voice, contents outputted on a computer screen and keyboard information inputted by a user.

However, since the screen reader searches for graphical user interface (GUI) elements of an output screen by using only linearized information arranged in one line without two-dimensional spatial position information with respect to the output screen, it is difficult to recognize screen output information. In particular, when information contained in the output screen increases, the difficulty is remarkably increased. In addition, since the screen reader provides only a text-based simple descriptive explanation for various graphic information such as pictures and diagrams other than characters or the GUI elements with a voice, the visually impaired people have great difficulty in understanding and interacting with the graphic information.

Another related art is a braille information terminal which delivers text information through the tactile sense by using braille cells. The braille information terminal may be used as an independent device for providing several functions of the computer useful to the visually impaired people, and may be used as an auxiliary screen output device for outputting the text information on the computer screen, which is analyzed by the screen reader, in braille. Both devices serve only as an alternate device that performs a few limited functions of the computer as a substitute for the computer, or only as an auxiliary output device that outputs the text information in braille, rather than as an interface for efficiently interacting with the computer. In particular, similar to the screen reader, the braille information terminal specialized for outputting the braille may not express the graphic information.

SUMMARY OF THE INVENTION

An object of the present invention is to provide a method, an apparatus, and a computer-readable medium for providing an internet browsing service through a tactile interface device, which allow a visually impaired person to intuitively use, interact, and control the tactile interface device that corresponds to a multi-array tactile cell-based smart braille device in order to increase the efficiency of the use of a smart device (smart phone, smart pad, etc.) or a smart braille device and to improve the level of informatization of the visually impaired person, so that the visually impaired person may intuitively use the content of a web page.

To achieve the objects described above, according to the present invention, there is provided a method implemented by a computing device including a processor to provide an internet browsing service through a tactile interface device connected to the computing device to interact with a user, in which the computing device includes an internet browser module for providing an internet browsing service, and the internet browser module includes: a tactile user interface (TUI) module for converting information displayed as a visual graphic into a form which is displayed as a tactile graphic on the tactile interface device; a browser main screen module for displaying a predetermined browser main screen when the internet browser module is executed; and a web page conversion module for converting information contained in a web page on internet into a form which is displayed by a visual display device connected to the computing device, the method including: a main screen display step of outputting a browser main screen, which is provided by the internet browser module, to the visual display device connected to the computing device, by executing the browser main screen module in the computing device; a first TUI step of generating an output signal for implementing a tactile screen of the tactile interface device corresponding to a screen displayed on the display device by the browser main screen module, and generating an input signal, which is to be inputted to the browser main screen module, from a user input inputted to the tactile interface device, by executing the TUI module in the computing device; a web page conversion step of outputting information, which includes the information contained in the web page converted by the web page conversion module, to the visual display device connected to the computing device, by executing the web page conversion module in the computing device; and a second TUI step of generating an output signal for implementing a tactile screen of the tactile interface device corresponding to a screen displayed on the display device by the web page conversion module, and generating an input signal, which is to be inputted to the web page conversion module, from a user input inputted to the tactile interface device, by executing the TUI module in the computing device.

According to the present invention, the web page conversion step may include: a web page loading step of loading the web page on the internet; an HTML analysis step of analyzing the web page and setting areas to classify the areas; a classification area score measurement step of obtaining evaluation scores of the areas classified in the HTML analysis step; and a content output step of setting a region of interest based on the evaluation scores of the areas, and generating an output signal including a content of the region of interest.

According to the present invention, the HTML analysis step may include: an HTML standard identification step of obtaining an HTML version of the web page by analyzing an HTML document of the web page; and an HTML5 analysis step of analyzing the web page based on an HTML5 standard and setting the areas to classify the areas when the HTML version of the web page is HTML5.

According to the present invention, the HTML5 analysis step may include one or more of: a Header tag area classification step of identifying presence or absence of a Header tag in the web page and setting an area for the Header tag when the Header tag is present; a Nav tag area classification step of identifying presence or absence of a Nav tag in the web page and setting an area for the Nav tag when the Nav tag is present; an Aside tag area classification step of identifying presence or absence of an Aside tag in the web page and setting an area for the Aside tag when the Aside tag is present; an Article tag area classification step of identifying presence or absence of an Article tag in the web page and setting an area for the Article tag when the Article tag is present; a Section tag area classification step of identifying presence or absence of a Section tag in the web page and setting an area for the Section tag when the Section tag is present; and a Div tag area classification step of identifying presence or absence of a Div tag in the web page and setting an area for the Div tag when the Div tag is present.

According to the present invention, the HTML analysis step may further include: an HTML4 analysis step of analyzing the web page based on an HTML4 standard and setting the areas to classify the areas when the HTML version of the web page is HTML5.

According to the present invention, the content output step may include: a score-based classification area alignment step of aligning the classified areas based on the evaluation scores; a region-of-interest determination step of setting an area, which has a highest evaluation score among the classified areas, as the region of interest; and a region-of-interest content output step of generating the output signal including the content of the region of interest.

According to the present invention, the web page conversion step may further include: a classification area link list generation step of generating a link list by extracting a link present in the classified areas, wherein the content output step may generate an output signal including the link list.

According to the present invention, the method may further include: a bookmark list display step of outputting information including a bookmark list, which is created by selection of the user and includes information on one or more specific web pages on the internet, to the visual display device connected to the computing device, by executing a bookmark management module in the computing device; and a third TUI step of generating an output signal for implementing a tactile screen of the tactile interface device corresponding to a screen displayed on the display device by the bookmark management module, and generating an input signal, which is to be inputted to the bookmark management module, from a user input inputted to the tactile interface device, by executing the TUI module in the computing device.

According to the present invention, the method may further include: a bookmark addition step of adding the information of the web page, which is outputted by the web page conversion step, to the bookmark list.

According to the present invention, the method may further include: a bookmark deletion step of deleting the information of the web page, which is selected by a user input, from the bookmark list outputted by the bookmark list display step.

According to the present invention, the method may further include: a search engine selection step of outputting information including a search engine list stored in a search engine management module to the visual display device connected to the computing device, by executing the search engine management module in the computing device; and a fourth TUI step of generating an output signal for implementing a tactile screen of the tactile interface device corresponding to a screen displayed on the display device by the search engine management module, and generating an input signal, which is to be inputted to the search engine management module, from a user input inputted to the tactile interface device, by executing the TUI module in the computing device.

According to the present invention, the method may further include: a search engine management step of adding information of a search engine to the search engine list or deleting the information of the search engine from the search engine list.

According to the present invention, the search engine list may include: a default search engine list including information of one or more predetermined search engines; and an additional search engine list including information of a search engine selected by a user input, and, in the search engine management step, the search engine may be added to the additional search engine list among the search engine lists, or the search engine may be deleted from the additional search engine list.

According to the present invention, the method may further include: a search word input step of inputting a search word to be searched into a search engine which is selected in the search engine selection step; and a fifth TUI step of generating an output signal for implementing a tactile screen of the tactile interface device corresponding to a screen displayed on the display device by the search engine management module, and generating an input signal, which is to be inputted to the search engine management module, from a user input inputted to the tactile interface device, by executing the TUI module in the computing device, wherein, in the search word input step, the user may directly input the search word or select the search word from a search word list including one or more search words.

According to the present invention, the method may further include: a search word management step of adding the search word to the search word list or deleting the search word from the search word list.

To achieve the objects described above, according to the present invention, there is provided a system implemented by a computing device including a processor to provide an internet browsing service through a tactile interface device connected to the computing device to interact with a user, wherein the computing device includes an internet browser module for providing an internet browsing service, and the internet browser module includes: a tactile user interface (TUI) module for converting information displayed as a visual graphic into a form which is displayed as a tactile graphic on the tactile interface device; a browser main screen module for displaying a predetermined browser main screen when the internet browser module is executed; and a web page conversion module for converting information contained in a web page on internet into a form which is displayed by a visual display device connected to the computing device.

To achieve the objects described above, according to the present invention, there is provided a computer-readable medium for controlling a tactile interface device connected to a computing device to provide an internet browsing service to a visually impaired person, wherein the computer-readable medium stores instructions for allowing the computing device to execute: a main screen display step of outputting a browser main screen, which is provided by an internet browser module, to a visual display device connected to the computing device; a first TUI step of generating an output signal for implementing a tactile screen of the tactile interface device corresponding to a screen displayed on the display device by the main screen display step, and generating an input signal, which is to be inputted to the computing device, from a user input inputted to the tactile interface device; a web page conversion step of outputting information, which includes information contained in a web page converted by the computing device, to the visual display device connected to the computing device; and a second TUI step of generating an output signal for implementing a tactile screen of the tactile interface device corresponding to a screen displayed on the display device by the computing device, and generating an input signal, which is to be inputted to the computing device, from a user input inputted to the tactile interface device, by executing a tactile user interface (TUI) module in the computing device.

According to an embodiment of the present invention, based on the multi-array tactile cell-based smart braille device and a tactile user interface (TUI) for a visually impaired person, the visually impaired person can easily access a desired page through a bookmark and a search engine while using the internet.

According to an embodiment of the present invention, a general web page, which is a combination of a menu, a body text, a link, a picture, and the like that are difficult for the visually impaired person to recognize, is divided into areas, and the areas of the web page are prioritized, so that the visually impaired person can easily understand the web page.

According to an embodiment of the present invention, when the visually impaired person uses a web page, an HTML of the web page is analyzed to discriminate the areas, scores of each of the areas are measured so as to set an area which is determined to include a content of interest of the user as a region of interest, and the region of interest is firstly provided to the visually impaired person, so that the visually impaired person can easily recognize contents of the web page.

According to an embodiment of the present invention, the link existing in the area is extracted and put on a list, so that the visually impaired person can easily select the link to move to a web page corresponding to the link.

According to an embodiment of the present invention, the HTML standard of the web page is identified to analyze a web page structure according to the HTML version so as to effectively discriminate the areas, so that the visually impaired person can be provided with the contents of the web page.

BRIEF DESCRIPTION OF THE DRAWINGS

FIGS. 20A and 20B are views showing browser main screens displayed by a browser main screen module according to an embodiment of the present invention.

DETAILED DESCRIPTION OF THE INVENTION

In the following, various embodiments and/or aspects will now be described with reference to the drawings. In the following description, for purposes of explanation, numerous specific details are set forth in order to provide a thorough understanding of one or more aspects. However, it will also be appreciated by those of ordinary skill in the art that such aspect(s) may be practiced without these specific details. The following description and the annexed drawings describe certain illustrative aspects of the one or more aspects in detail. It is to be understood, however, that such aspects are illustrative and some of the various ways of practicing various aspects of the principles of various aspects may be utilized, and that the description set forth is intended to include all such aspects and their equivalents.

1. Braille OS Module as Virtual Operating System for Controlling Tactile Interface Device FIG. 1 is a view schematically showing an overall system including a tactile interface device and a computing device according to an embodiment of the present invention.

Figure 1:
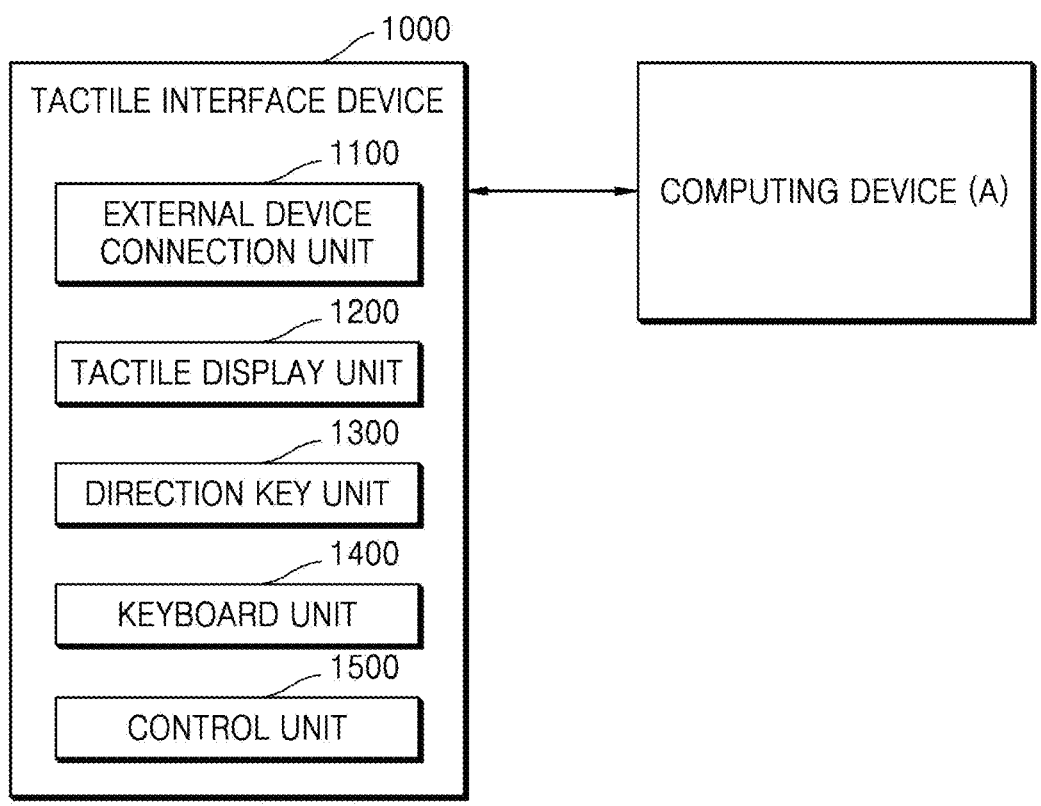
FIG. 1 is a view schematically showing an overall system including a tactile interface device and a computing device according to an embodiment of the present invention.

A tactile interface device 1000 shown in FIG. 1 is provided only as an example, and the present invention is not limited thereto. The tactile interface device 1000 connected to a computing device A for controlling the tactile interface device according to the present invention, which is described hereinafter, includes all of any interface device capable of providing a tactile graphic, a tactile interface device capable of interacting with a user, and a computing device capable of outputting the tactile graphic.

As shown in FIG. 1, the computing device A is connected to the tactile interface device 1000, and such connection includes both wired connection and wireless connection.

The computing device A may include a smart phone, a tablet, a personal computer (hereinafter referred to as "PC"), a mobile phone, a videophone, an e-book reader, a desktop PC, a laptop PC, a netbook PC, a personal digital assistant (hereinafter referred to as "PDA"), a portable multimedia player (hereinafter referred to as "PMP"), an mp3 player, a portable medical device, a camera, a wearable device (for example, a head-mounted device, hereinafter referred to as "HMD"), an electronic garment, an electronic bracelet, an electronic necklace, an electronic appcessory, an electronic tattoo, and a smart watch.

The computing device A may include at least one processor and memory, and may be selectively connected to a display device such as a monitor or may be provided therein with a display module.

Alternatively, the computing device A may be in a form combined with the tactile interface device 1000. In this case, the tactile interface device 1000 and the computing device A for controlling the tactile interface device 1000 may be recognized as a single device from the viewpoint of the user. In the case of the above combination-type device, the computing device A and the tactile interface device 1000 may be in the form of sharing the processor and the memory.

The tactile interface device 1000 shown in FIG. 1 includes: an external device connection unit 1100 for performing wired or wireless communication with the computing device A or the like; a tactile display unit 1200 for providing tactile information to a user through a plurality of pins; a direction key unit 1300 for changing a position of an input coordinate or a focused detailed content; a keyboard unit 1400 for receiving information from the user in form of a key input; and a control unit 1500 for controlling operations of the external device connection unit 1100, the tactile display unit 1200, the direction key unit 1300, and the keyboard unit 1400.

The external device connection unit 1100 includes one or more of a communication module unit for performing wireless communication and a wired connection unit for accessing an external device in a wired manner. The communication module unit includes at least one of a Bluetooth communication module, a Zigbee communication module, an infrared communication module, a Bluetooth low energy (BLE) communication module, an audio communication module, a long term evolution (LTE) communication module, a WiFi communication module, an IrDA-based infrared communication module, a wireless LAN (WLAN), a WiBro module, and a wireless USB module. Meanwhile, the wired connection unit 1120 preferably includes a connection module using a universal serial bus (USB) interface, as well as a wired connection module capable of transmitting and receiving data.

The tactile display unit 1200 may provide the tactile information by using a tactile pixel having at least one dimension, and the tactile pixel may include a plurality of pins moved up and down by applying a power to a transducer including a piezoelectric ceramic and an elastic body. Preferably, the tactile pixel provides the tactile information in two dimensions.

The tactile display unit 1200 includes: a display data reception unit for providing data received from an external user terminal, or receiving data generated in the tactile interface device; a tactile data conversion unit for converting the data into tactile display data; a plurality of pin drive modules driven by the tactile display data; and a driving power supply unit for receiving a power for driving the tactile display unit 1200, wherein the tactile display unit 1200 provides the tactile information or the tactile graphic based on the received data.

The tactile display unit 1200 may display or provide the tactile pixel having at least one dimension. In one example, the tactile pixel may include a plurality of pins moved up and down by applying the power to the transducer including the piezoelectric ceramic and the elastic body.

In detail, the tactile pixel is displayed by a plurality of pin drive module groups, and each of the pin drive module groups includes a plurality of pin drive modules. Alternatively, an entire pin drive module may constitute a single pin drive module group.

Meanwhile, the direction key unit 1300 changes the position of the input coordinate or the focused detailed content.

The keyboard unit 1400 is configured in the form of a key which can be inputted to the tactile interface device 1000 by a visually impaired person. The keyboard unit 1400 may include a plurality of keys, and an input of each of the keys may be converted into an instruction of an application being executed in the computing device A.

Meanwhile, the user inputs instructions or information to the tactile interface device through the direction key unit 1300 and the keyboard unit 1400, and the tactile interface device 1000 converts the inputted instructions or information so as to transmit the converted instructions or information to the computing device A.

Meanwhile, the keyboard unit 1400 preferably includes a braille keyboard for converting braille characters which are currently used frequently and generally by the visually impaired person into general characters to transmit a character input signal to a computer.

The keyboard unit 1400 receives the braille to transmit the braille to the tactile interface device 1000 or the computing device A connected to the tactile interface device 1000. The keyboard unit 1400 may include a braille key, a shortcut key, and an enter or space key.

Since the braille includes several dots to form a single letter, when the braille key is simultaneously pressed, information of a resulting braille may be transmitted. The transmitted braille information may be braille-translated into a general character through software in the tactile interface device 1000 or software of the computing device.

Accordingly, for the purpose of a computer input/output function for the visually impaired person, the tactile display unit 1200 serves the same role as a monitor of a general computer, and the direction key unit 1300 and the keyboard unit 1400 serve as input devices such as a keyboard or a mouse of the general computer.

Figure 2:
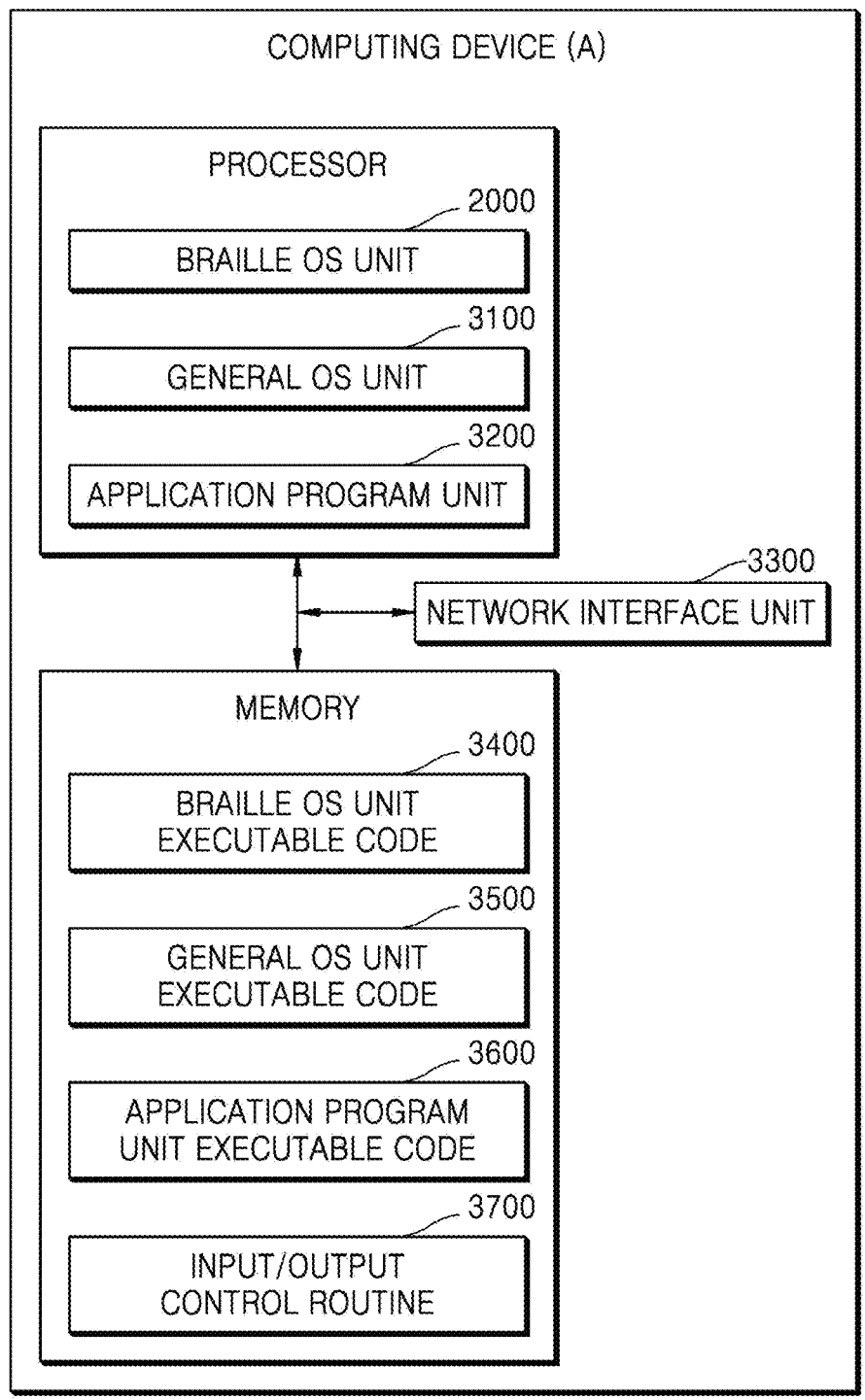
FIG. 2 is a view schematically showing an internal configuration of the computing device according to an embodiment of the present invention.

FIG. 2 is a view schematically showing an internal configuration of the computing device according to an embodiment of the present invention.

According to an embodiment of the present invention, the computing device for controlling the tactile interface device 1000 may include a processor, a network interface unit, a memory, and a bus (corresponding to a bi-directional arrow between the processor, the memory, and the network interface unit). The memory may include a braille OS unit executable code 3400, a general OS unit executable code 3500, an application program unit executable code 3600, and an input/output control routine 3700. The processor may include a braille OS unit 2000; a general OS unit 3100; and an application program unit 3200. In this case, the general OS unit 3100 corresponds to a main operating system of the computing device, and may include an ANDROID OS of GOOGLE, a WINDOWS OS of MICROSOFT, etc.

In other embodiments, the computing device A for controlling the tactile interface device 1000 may include more components than the components of FIG. 2.

The memory is a computer-readable recording medium, and may include a permanent mass storage device such as a random access memory (RAM), a read only memory (ROM), and a disk drive. In addition, the braille OS unit executable code 3400, the general OS unit executable code 3500, the application program unit executable code 3600, and the input/output control routine 3700 may be stored in the memory. The above software components may be loaded from a recording medium which is readable in an additional computer other than the memory by using a drive mechanism (not shown). The above recording medium readable in the additional computer may include a computer-readable recording medium (not shown) such as a floppy drive, a disk, a tape, a DVD/CD-ROM drive, and a memory card. In other embodiments, the software components may be loaded into the memory via a network interface unit 3300 other than the computer-readable recording medium.

The bus may enable communication and data transmission between the components of the computing device for controlling the tactile interface device. The bus may be configured by using a high-speed serial bus, a parallel bus, a storage area network (SAN), and/or other suitable communication technologies.

The network interface unit 3300 may be a computer hardware component for connecting the computing device A for controlling the tactile interface device 1000 to a computer network. The network interface unit 3300 may connect the computing device for controlling the tactile interface device to the computer network via wireless or wired connection. Via the network interface unit 3300, the computing device for controlling the tactile interface device may be connected to the tactile interface device in a wireless or wired manner.

The processor may be configured to process an instruction of the computer program by performing basic calculation, logic, and an input/output operation of the computing device for controlling the tactile interface device. The instruction may be provided to the processor by the memory or the network interface unit 3300 and via the bus. The processor may be configured to execute program codes for the braille OS unit 2000, the general OS unit 3100, and the application program unit 3200. The above program codes may be stored in a recording device such as a memory.

The braille OS unit 2000 may be configured to perform a method of controlling the tactile interface device 1000, which will be described below. In the above processor, depending on the method of controlling the tactile interface device, some components may be omitted, additional components not shown in the drawings may be further included, or at least two components may be combined.

Figure 3:
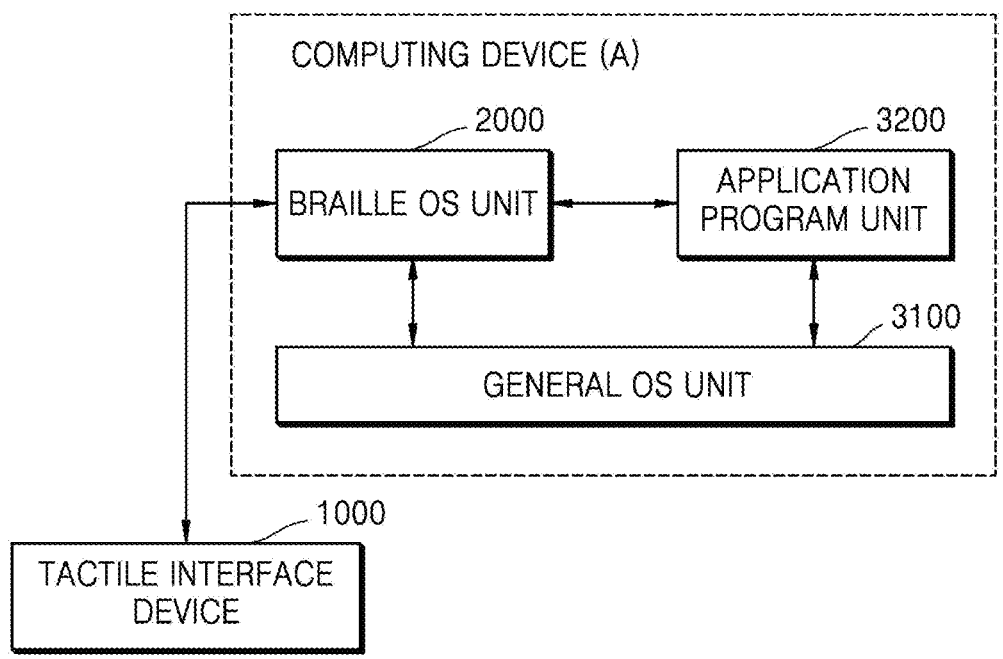
FIG. 3 is a view schematically showing an operating environment of a braille OS unit according to an embodiment of the present invention.

FIG. 3 is a view schematically showing an operating environment of a braille OS unit according to an embodiment of the present invention.

The general OS unit 3100 corresponds to a software module corresponding to the main operating system of the computing device A, and the braille OS unit 2000 and the application program unit 3200 are driven under the control of the general OS unit 3100. In other words, according to the present invention, the method of controlling the tactile interface device may be implemented by the braille OS unit corresponding to a virtual sub-operating system for the tactile interface device, which is operated under the control of the main operating system of the computing device A.

The braille OS unit 2000 controls an overall operation related to the driving and the input/output of the tactile interface device 1000 while controlling the input/output between the application program unit 3200 operated under the control of the general OS unit 3100 and the tactile interface device 1000.

In addition, the braille OS unit 2000 may include an application program for controlling an environment of the tactile interface device 1000, and an embedded basic program which is capable of performing the input/output in the tactile interface device 1000.

Meanwhile, in the environment of the braille OS unit 2000, developers may develop software or application programs for the visually impaired person based on an actual display of the computing device, for example, a display of a smart phone, and the input/output of the above application programs with respect to the tactile interface device 1000 may be performed by the braille OS unit 2000.

In other words, according to the braille OS unit 2000 for performing the method of controlling the tactile interface device of the present invention, when a general developer develops software having a general GUI, the developed software may be implemented in the tactile interface device 1000 through the braille OS unit 2000 in such a form that the visually impaired person may perform input/output, so that a general software developer can supply various software to the visually impaired person.

Figure 4:
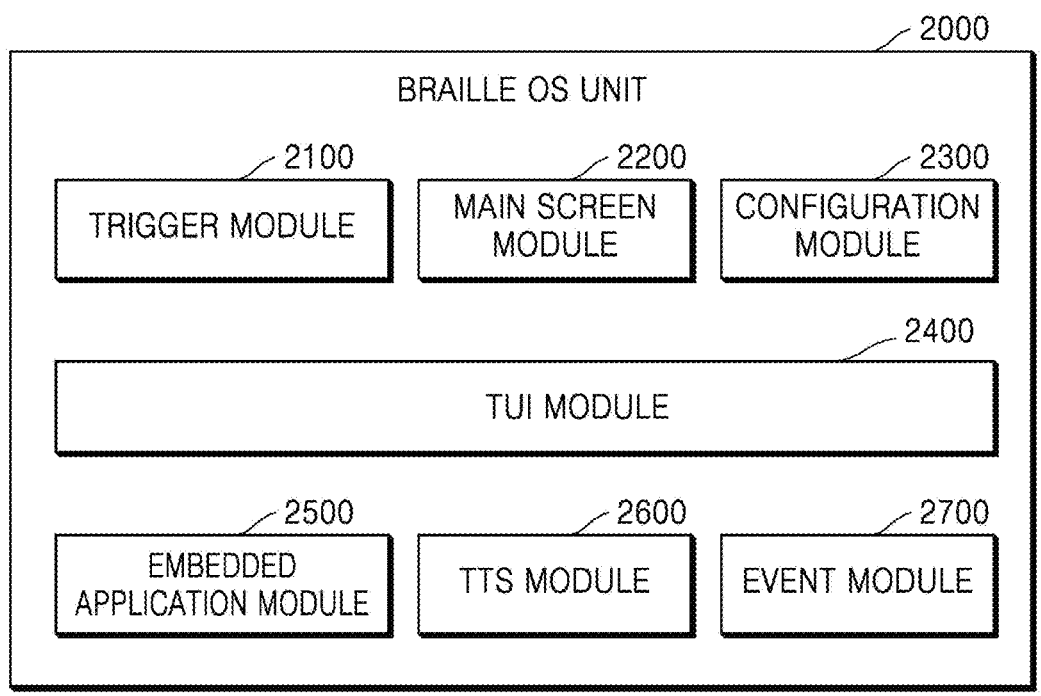
FIG. 4 is a view schematically showing an internal configuration of the braille OS unit according to an embodiment of the present invention.

FIG. 4 is a view schematically showing an internal configuration of the braille OS unit according to an embodiment of the present invention. As shown in FIG. 4, the braille OS unit 2000 includes a trigger module 2100, a main screen module 2200, a configuration module 2300, a tactile user interface (TUI) module 2400, an embedded application module 2500, a text-to-speech (TTS) module 2600, and an event module 2700.

The trigger module 2100 performs: confirming connection between the computing device A and the tactile interface device 1000; and calling execution of a step of executing the main screen module 2200 when it is determined that the computing device A and the tactile interface device 1000 are connected to each other.

Basically, the braille OS unit 2000 is executed in a computing device that interfaces with a visual display. Therefore, it is necessary to execute the braille OS unit in order to allow the visually impaired person to use the tactile interface device by executing each of the modules of the braille OS unit in the computing device.

In general, an application on the smart phone is executed by the user by identifying an application icon or the like on a GUI of the smart phone and performing a touch input, but it may be difficult for the visually impaired person to perform such an operation.

Unlike an application executed in a general computing device, since the braille OS unit is executed by the visually impaired person having difficulty in visual recognition, the trigger module 2100 operates in a background of the main operating system, and primarily calls execution of the main screen module 2200 when the visually impaired person connects the tactile interface device to the computing device A (preferably, such connection is established as the visually impaired person inputs a physical button present on the tactile interface device).

Figures 5A, 5B:
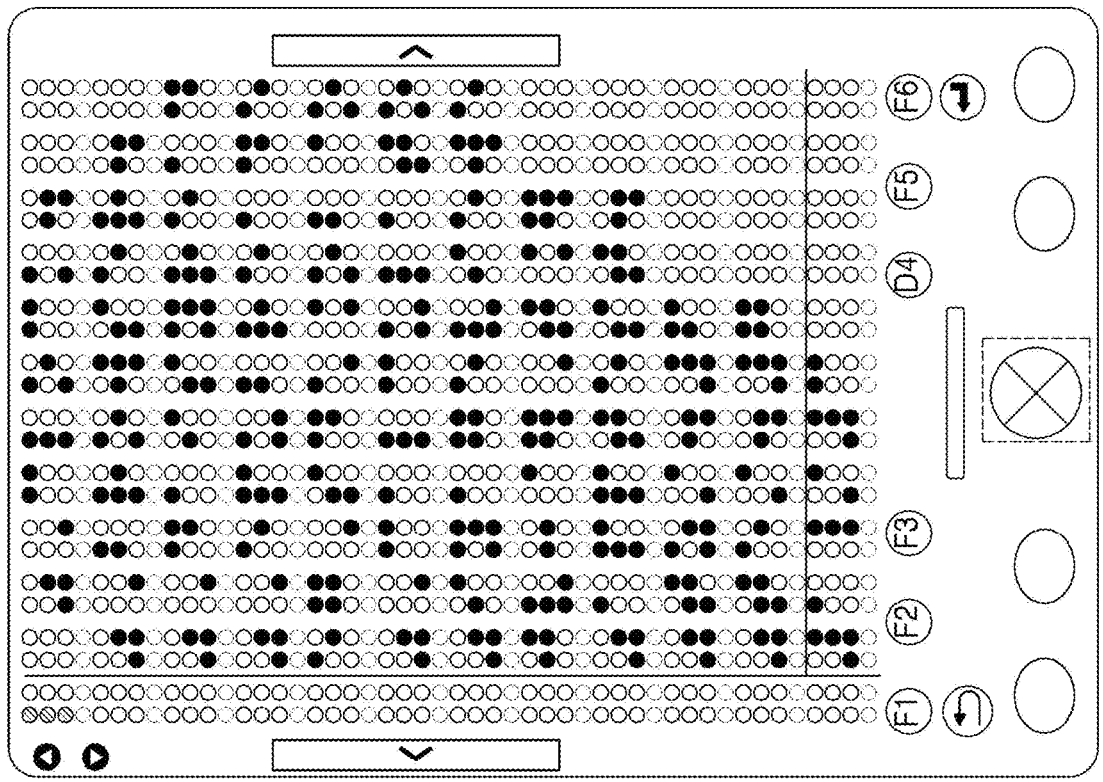
FIGS. 5A and 5B are views schematically showing display screens of the computing device and a tactile display of the tactile interface device according to an embodiment of the present invention.

For example, when the tactile interface device as shown in FIGS. 5A and 5B is started, the main screen module 2200 may display a main screen of the braille OS unit similarly to a window desktop screen, and provide a page for allowing the user to select a desired module or function on the main screen.

Preferably, the main screen module 2200 simply provides an interface displayed on the computing device as shown in FIG. 5A. In other words, when the main screen module is executed, the visual display device connected to the computing device displays a GUI interface as shown in FIG. 5A. At the same time, an output signal of the GUI interface is converted into an output signal of a tactile interface by the TUI module 2400, and the converted output signal is transmitted to the tactile interface device 1000, so that the visually impaired person may recognize the main screen with a tactile sense. Both of an application program mounted in the braille OS unit or an external application program operated under the control of the braille OS unit may be created to provide such a GUI.

Meanwhile, the main screen module 2200 is provided by the braille OS unit 2000. In other words, when the braille OS unit 2000 is executed, the main screen module primarily provided by the braille OS unit, that is, the sub-operating system executed under the control of the main operating system, is executed. Alternatively, the main screen module may be executed by the trigger module.

The configuration module 2300 is a module that provides an interface for changing settings of the braille OS unit 2000 and/or settings of the tactile interface device 1000. Similarly, when the configuration module 2300 is executed, an interface for changing settings is provided in the display device connected to the computing device A, and the TUI module 2400 simultaneously converts the interface into a form which enables input/output in the tactile interface device 1000.

The TUI module 2400 generates an output signal for implementing a tactile screen of the tactile interface device 1000 corresponding to a screen displayed on the computing device A by the main screen module or other application modules, and generates an input signal, which is to be inputted to the main screen module 2200, from a user input inputted to the tactile interface device 1000.

In other words, the TUI module 2400 is provided by the main screen module 2200 and the braille OS unit 2000, and serves to convert a GUI of an embedded application or an external application running under the control of the main operating system into a tactile user interface (TUI) interfaceable with the tactile interface device 1000. Accordingly, when the general developer develops only general software that is operable in the computing device A, an interface of the software is converted into a form which can be interfaced in the tactile interface device by the TUI module 2400, and as a result, the visually impaired person may use the software.

In other words, the braille OS unit 2000 may perform: an application module execution step which is called according to a user input in the main screen module 2200; and a second TUI step of executing the TUI module provided by the sub-operating system. In the second TUI step, an output signal for implementing a tactile screen of the tactile interface device corresponding to a screen displayed on the computing device by the application module is generated, and an input signal, which is to be inputted to the application module, is generated from a user input inputted to the tactile interface device.

The embedded application module 2500 may include an application such as an alarm application, a clock application, a basic document creator application, and a basic document viewer application. Similarly, although the embedded application is created based on a GUI for ordinary people, the embedded application may also be used by the visually impaired person through the tactile interface device by the TUI module 2400.

The TTS module 2600 performs a TTS function for the elements displayed or tactually displayed by the main screen module 2200, the configuration module 2300, or other application modules, or performs a function of requesting execution of the TTS function to a module having the TTS function operated in the main operating system while providing text information which is subject to the TTS function.

The event module 2700 generates an event notification output signal to the tactile interface device based on a connection state between the user terminal and the tactile interface device. The visually impaired person may not easily recognize a case when the tactile interface device interfacing with the visually impaired person is disconnected from the computing device. In order to solve such a problem, the braille OS unit provides the event module so as to perform a function of immediately transmitting information on a connection failure to the tactile interface device.

FIGS. 5A and 5B are views schematically showing display screens of the computing device and a tactile display of the tactile interface device according to an embodiment of the present invention.

FIG. 5A is a view showing a display screen of the computing device when the main screen module is executed in a case where the computing device is a smart phone, and FIG. 5B is a view showing a state of the tactile interface device at the time when FIG. 5A is displayed.

The main screen module 2200 displays items (contents) in a one-dimensional array, and displays a cursor corresponding to each of the items such that the cursor is positioned next to each of the items. In other words, the main screen module divides the contents into a plurality of units, and displays the contents which are divided into the units on the computing device. Then, the TUI module 2400 classifies the contents that are divided into the units by a plurality of sub-content areas.

Similarly, in the tactile interface device 1000, items (contents) are displayed in a one-dimensional array, and a cursor corresponding to each of the items is displayed to be positioned next to each of the items.

Figure 6:
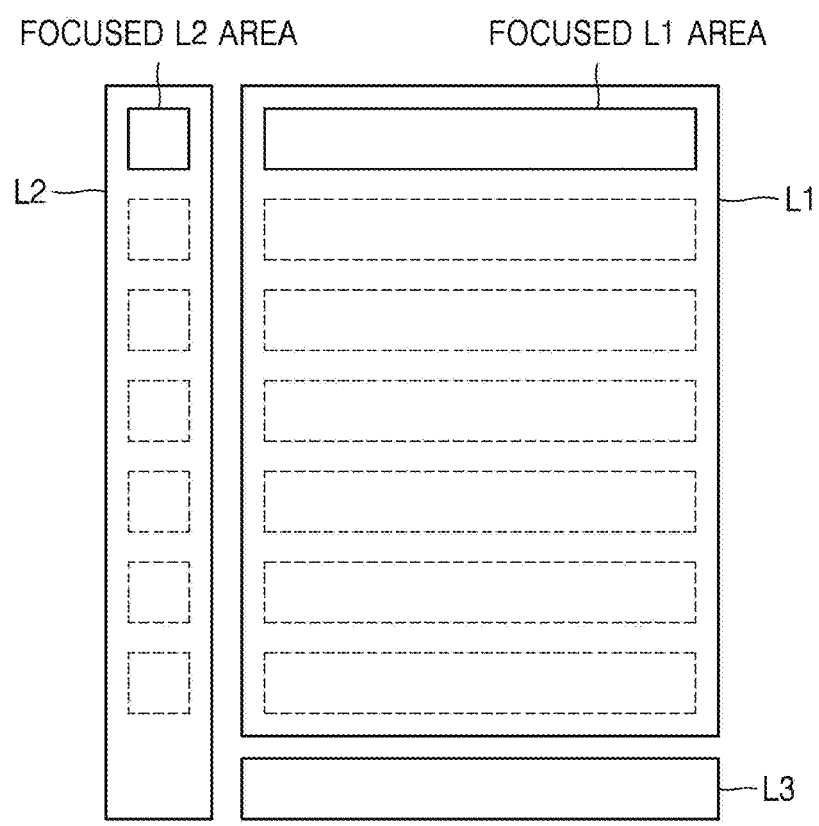
FIG. 6 is a view schematically showing an area configuration of the tactile display of the tactile interface device according to an embodiment of the present invention.

FIG. 6 is a view schematically showing an area configuration of the tactile display of the tactile interface device according to an embodiment of the present invention.

The tactile screen of the tactile interface device, which is implemented by the output signal generated by the TUI module 2400, includes: a content area L1 implemented based on a content part (items in FIG. 5) of a screen displayed on the computing device A by the main screen module 2200; a cursor area L2 for implementing a current position and a shape of a cursor of a user; and a page area L3 implemented based on page information of the screen displayed on the computing device by the main screen module 2200.

In addition, the content area may be divided into a plurality of sub-content areas, the cursor area may be divided into a plurality of sub-cursor areas, and a position of the cursor implemented in the cursor area preferably corresponds to a position of a focused sub-content area. This type of tactile display corresponds to a structure that allows the visually impaired person to recognize information and perform input most efficiently.

The sub-content area includes a plurality of braille cell groups, and each of the braille cell groups includes a plurality of braille cells, for example, six braille cells. In this case, a single braille cell refers to a single braille hole.

Similarly, each of the sub-cursor areas includes one or more braille cells, preferably a plurality of braille cells capable of notifying position and shape information of the cursor.

More preferably, as in the "focused L2 area" and the "focused L1 area" of FIG. 6, the sub-cursor area and the sub-content area corresponding to the sub-content area are aligned on a single axis.

2. Method of Providing Internet Browsing Service Through Tactile Interface Device FIG. 7 is a view schematically showing configurations of an internet browser module and the tactile interface device according to an embodiment of the present invention.

Figure 7:
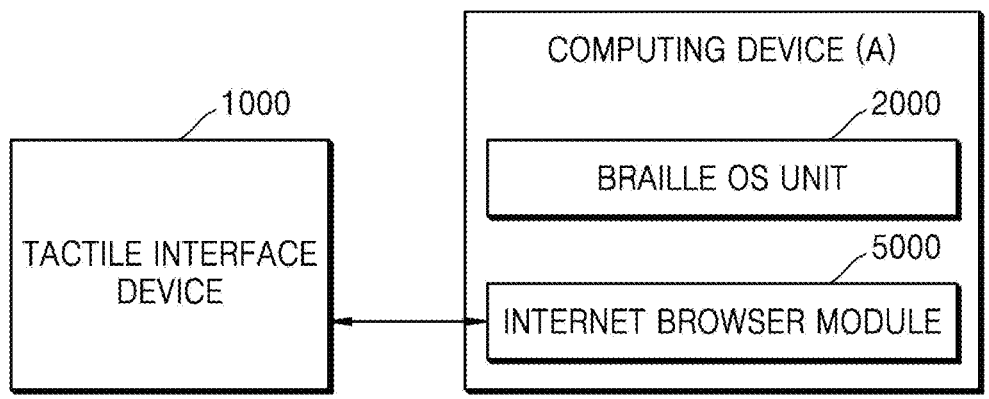
FIG. 7 is a view schematically showing configurations of an internet browser module and the tactile interface device according to an embodiment of the present invention.

The computing device A shown in FIG. 7 is has a configuration according to the above description set forth with reference to FIGS. 2 and 3. Meanwhile, the braille OS unit 2000 of FIG. 7 has a configuration according to the description set forth with reference to FIG. 4.

Meanwhile, the internet browser module 5000 of FIG. 7 may be one example of the application program unit 3200 of FIG. 3, or may be the embedded application module 2500 of FIG. 4.

Similarly, the information outputted from the internet browser module 5000 may be displayed in a visual form recognizable to ordinary people on the display device connected to the computing device A. Likewise, an input/output signal may be converted into a form which is interfaceable with the visually impaired person in the tactile interface device 1000 by a common TUI module mounted in the braille OS unit 2000 or a special TUI module only for the internet browser module 5000 that is mounted in the internet browser module 5000.

Preferably, in an embodiment of the present invention, the braille OS unit 2000 includes a common TUI module 2400, and the internet browser module 5000 preferably includes a separate TUI module 5100 which allows the visually impaired person to smoothly interface with the internet browser module 5000 in consideration of distinct characteristics of the internet browser module 5000.

Similarly, the internet browser module 5000 is executed under the control of the braille OS unit 2000, and the TTS module 2600, the event module 2700, and the like may be simultaneously executed while the internet browser module 5000 is being controlled.

Figure 8:
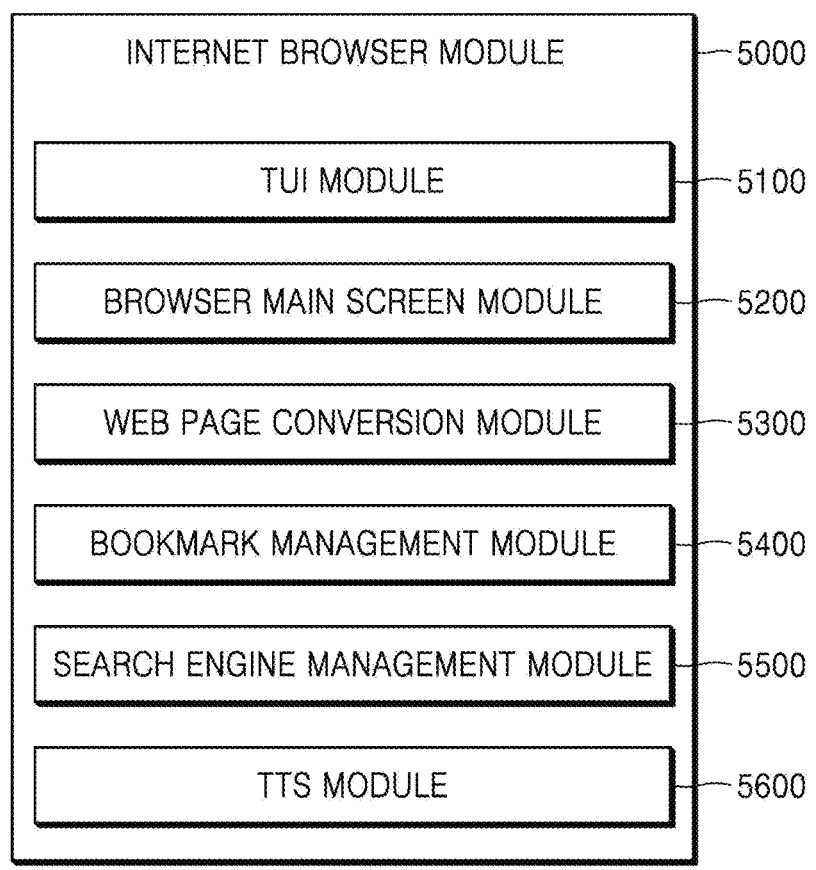
FIG. 8 is a view schematically showing an internal configuration of the internet browser module according to an embodiment of the present invention.

FIG. 8 is a view schematically showing an internal configuration of the internet browser module according to an embodiment of the present invention.

As described above, the internet browser module 5000 is implemented by the computing device A including the processor to provide the internet browsing service through the tactile interface device 1000 connected to the computing device A to interact with the user.

Meanwhile, the internet browser module 5000 includes: a TUI module 5100 for converting a signal inputted to and outputted from an internal function module of the internet browser module into a form which is more intuitively recognized or inputted in the tactile interface device 1000 (in this case, the TUI module is preferably a separate module included in the internet browser module other than the TUI module 2400 of the braille OS unit 2000 shown in FIG. 4); a browser main screen module 5200 for displaying a predetermined browser main screen when the internet browser module is executed; a web page conversion module 5300 for converting information contained in a web page on internet into a form which is displayed by a visual display device connected to the computing device; a bookmark management module 5400 for managing a bookmark list which is created by selection of the user and includes information on one or more specific web pages on the internet; a search engine management module 5500 for providing a search engine list including information on one or more search engines for internet search, and managing the search engine list; and a TTS module 5600 for performing a TTS function for the elements which are visually displayed or tactually displayed, or performing a function of requesting execution of the TTS function to a module having the TTS function operated in the main operating system while providing text information which is subject to the TTS function.

The TUI module 5100 converts information displayed as a visual graphic in the browser main screen module 5200, the web page conversion module 5300, the bookmark management module 5400, and the search engine management module 5500 into a form displayed as a tactile graphic in the tactile interface device 1000.

First, when the internet browser module 5000 is operated, the browser main screen module 5200 is executed in the computing device A. The browser main screen module 5200 may display a main screen of an internet browser, and provide a page for allowing the user to select a desired module or function on the main screen.

Preferably, the browser main screen module 5200 provides an interface displayed on the computing device A.

A main screen display step S1000 of outputting a browser main screen to the visual display device connected to the computing device A when the browser main screen module 5200 is executed is performed. In other words, the browser main screen module 5200 is an application which may be used by ordinary people similarly to the application program unit 3200 of FIG. 3 or the embedded application module 2500 of FIG. 4, and a default output screen corresponds to a GUI-based visual output similarly to a general application.

Thereafter, a first TUI step S1100 of generating an output signal for implementing a tactile screen of the tactile interface device 1000 corresponding to a screen displayed on the display device by the browser main screen module 5200, and generating an input signal, which is to be inputted to the browser main screen module 5200, from a user input inputted to the tactile interface device 1000 by executing the TUI module 5100 in the computing device A according to the execution of the browser main screen module 5200 is performed. The TUI module 5100 serves to convert input/output signals of the browser main screen module 5200, the web page conversion module 5300, the bookmark management module 5400, and the search engine management module 5500 into a form inputted to and outputted from the tactile interface device 1000. However, for convenience, a step of converting the input/output signals of the browser main screen module 5200 will be referred to as the first TUI step S1100.

Meanwhile, the browser main screen module 5200 provides a menu interface for calling the web page conversion module 5300, the bookmark management module 5400, and the search engine management module 5500, and the menu interface is implemented in the tactile interface device 1000 through the TUI module 5100. In this case, the user may perform input on a menu in the tactile interface device 1000 to execute the web page conversion module 5300.

A web page conversion step S1200 of outputting information, which includes the information contained in the web page converted by the web page conversion module 5300, to the visual display device connected to the computing device A when the web page conversion module 5300 is executed in the computing device A is performed. Then, a second TUI step S1300 of generating an output signal for implementing a tactile screen of the tactile interface device 1000 corresponding to a screen displayed on the display device by the web page conversion module 5300, and generating an input signal, which is to be inputted to the web page conversion module 5300, from a user input inputted to the tactile interface device 1000 by executing the TUI module 5100 in the computing device A is performed.

Meanwhile, the user may perform the input on the menu in the tactile interface device 1000 to execute the bookmark management module 5400.

A bookmark list display step S1400 of outputting information including a stored bookmark list to the visual display device connected to the computing device A when the bookmark management module 5400 is executed in the computing device A is performed. Then, a third TUI step S1500 of generating an output signal for implementing a tactile screen of the tactile interface device 1000 corresponding to a screen displayed on the display device by the bookmark management module 5300, and generating an input signal, which is to be inputted to the bookmark management module 5300, from a user input inputted to the tactile interface device 1000 by executing the TUI module 5100 in the computing device A is performed.

Meanwhile, the user may perform the input on the menu in the tactile interface device 1000 to execute the search engine management module 5500.

A search engine selection step S1600 of outputting information including a stored search engine list to the visual display device connected to the computing device A when the search engine management module 5500 is executed in the computing device A is performed. Then, a fourth TUI step S1700 of generating an output signal for implementing a tactile screen of the tactile interface device 1000 corresponding to a screen displayed on the display device by the search engine management module 5400, and generating an input signal, which is to be inputted to the search engine management module 5300, from a user input inputted to the tactile interface device 1000 by executing the TUI module 5100 in the computing device A is performed. Thereafter, a search word input step S2000 of inputting a search word to be searched into a search engine which is selected in the search engine selection step S1600 is performed, and a fifth TUI step S2100 of generating an output signal for implementing a tactile screen of the tactile interface device 1000 corresponding to a screen displayed on the display device by the search engine management module 5400, and generating an input signal, which is to be inputted to the search engine management module 5300, from a user input inputted to the tactile interface device 1000 by executing the TUI module 5100 in the computing device A is performed.

Figure 9:
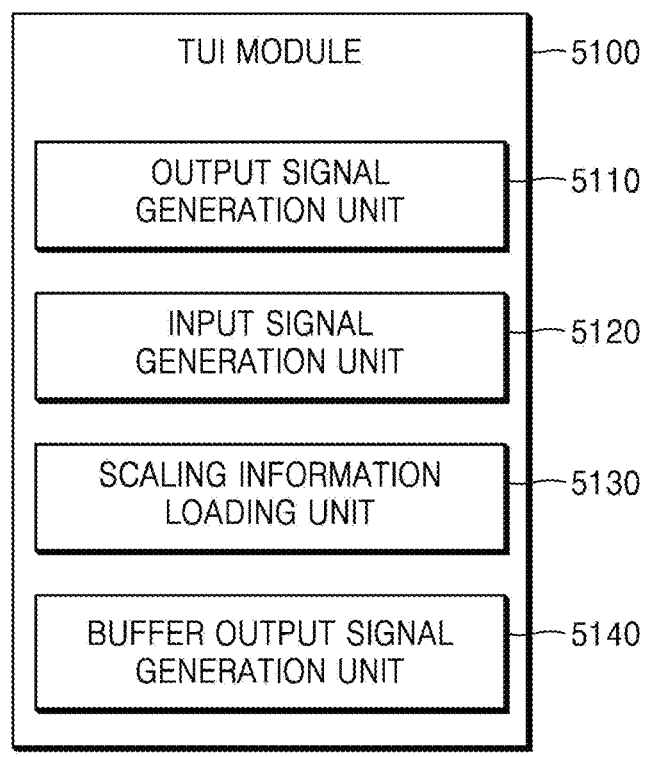
FIG. 9 is a view schematically showing an internal configuration of a TUI module of the internet browser module according to an embodiment of the present invention.

FIG. 9 is a view schematically showing an internal configuration of a TUI module of the internet browser module according to an embodiment of the present invention.

In detail, the TUI module 5100 of the internet browser module 5000 includes: an output signal generation unit 5110 for generating an output signal for implementing a tactile screen of the tactile interface device 1000 corresponding to a screen displayed on the computing device A by the main screen module 2200 or other applications; an input signal generation unit 5120 for generating an input signal by converting an input such as a key input in the tactile interface device 1000 into a form which is inputted to the main screen module or other applications executed in the computing device A; a scaling information loading unit 5130 for loading scaling information suitable for pixels of a tactile display unit of a connected tactile interface device upon an operation of the output signal generation unit 5110; and a buffer output signal generation unit 5140 for generating a buffer output signal including a control signal for a two-dimensional tactile cell array having a variation based on the output signal and previous tactile display information of the tactile interface device 1000.

In this case, the output signal and the buffer output signal include the control signal for the two-dimensional tactile cell array.

Meanwhile, the scaling information loading unit 5130 preferably loads tactile display pixel information in such a manner that the tactile display pixel information of the tactile interface device is automatically received from the connected tactile interface device. Alternatively, the tactile display pixel information may be stored in the memory of the computing device.

The output signal generation unit 5110 generates an output signal for implementing a tactile screen of the tactile interface device corresponding to a screen displayed on the computing device A. In this case, the output signal includes the control signal for the two-dimensional tactile cell array, and similar to the TUI module 2400 mounted in the braille OS unit 2000, the tactile screen of the tactile interface device which is implemented by the output signal includes: a content area L1 implemented based on a content part of the screen displayed on the computing device A by the main screen module 2200; a cursor area L2 for implementing a current position and a shape of a cursor of the user; and a page area L3 implemented based on page information of the screen displayed on the computing device by the main screen module 2200.

In addition, the tactile interface device is provided with various physical keys, and each of the physical keys is assigned a function to perform a more intuitive function. An instruction of an application operating in the computing device may be generated by the TUI module by inputting the physical key, and the instruction may be inputted to the application operating in the computing device.

In addition, the tactile screen of the tactile interface device, which is implemented by the output signal generated by the TUI module 5000 of the internet browser module, includes: a content area L1 implemented based on content parts of screens displayed on the computing device A by the browser main screen module 5200, the web page conversion module 5300, the bookmark management module 5400, and the search engine management module 5500; a cursor area L2 for implementing a current position and a shape of a cursor of the user; and a page area L3 implemented based on the page information of the screen displayed on the computing device by the main screen module 2200.

In addition, the content area may be divided into a plurality of sub-content areas, the cursor area may be divided into a plurality of sub-cursor areas, and a position of the cursor implemented in the cursor area preferably corresponds to a position of a focused sub-content area. More preferably, the sub-cursor area and the sub-content area corresponding to the sub-content area are aligned on a single axis in the tactile graphic of the tactile interface device implemented by the TUI module 5100 of the internet browser module 5000. In such a structure, the visually impaired person may recognize a portion focused by the cursor of the visually impaired person most efficiently. This type of interface is obtained from various experiments conducted for the visually impaired person by the applicant of the present invention.

Meanwhile, the buffer output signal generation unit 5140 generates the buffer output signal from the output signal of the output signal generation unit 5110 which is generated based on the output signals of the browser main screen module 5200, the web page conversion module 5300, the bookmark management module 5400, and the search engine management module 5500.

In this case, the output signal and the buffer output signal include the control signal for the two-dimensional tactile cell array.

Preferably, the first TUI step S1100, the second TUI step S1300, the third TUI step S1500, the fourth TUI step S1700, or the fifth TUI step S2100 is performed every time the screen displayed on the computing device A is changed by the browser main screen module 5200, the web page conversion module 5300, the bookmark management module 5400, or the search engine management module 5500, and, in a buffer output signal generation step, the buffer output signal is generated based on a difference between an immediately preceding output signal and a current changed output signal.

In detail, the buffer output signal generation step includes: loading a previous output signal generated by the output signal generation unit 5110 before the screen is changed by a current input of the user; calculating a difference between the previous output signal and a current output signal generated by the output signal generation unit after the screen is changed by the current input of the user; and generating a buffer output signal based on the difference between the current output signal and the previous output signal.

Figure 10:
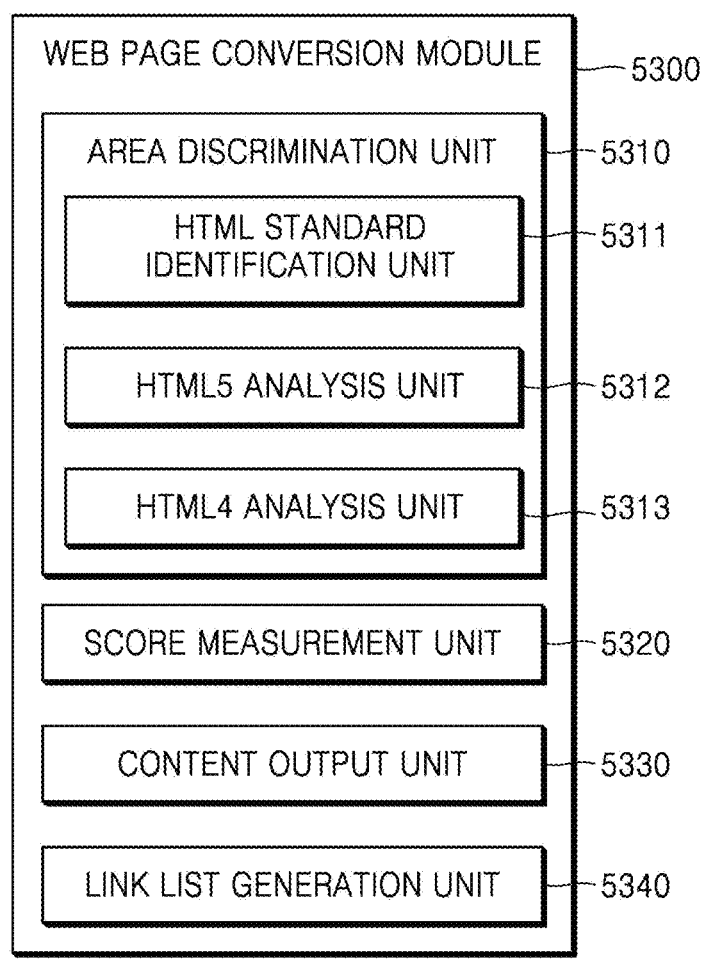
FIG. 10 is a view schematically showing an internal configuration of a web page conversion module according to an embodiment of the present invention.

FIG. 10 is a view schematically showing an internal configuration of a web page conversion module according to an embodiment of the present invention.

When the user visits the web page on the internet through the internet browser module 5000, the information contained in the web page is converted into a form which is displayed on the visual display device connected to the computing device A. In a case of a general web page, a menu, a body text, a link, a picture, and the like are combined in the web page, so that it is difficult for the visually impaired person to recognize the above contents when the above contents are directly translated into braille. Accordingly, the web page conversion module 5300 divides the web page into areas, and displays the contents of the web page by the areas, thereby allowing the visually impaired person to easily recognize the contents.

To this end, the web page conversion module 5300 includes: an area discrimination unit 5310 for analyzing a web page on internet and setting areas to classify the areas; a score measurement unit 5320 for obtaining evaluation scores of the classified areas; a content output unit 5330 for setting a region of interest based on the evaluation score of the areas, and generating an output signal including a content of the region of interest; and a link list generation unit 5340 for generating a link list by extracting a link present in the classified areas.

The area discrimination unit 5310 loads the web page on the internet to analyze the web page and set the areas to classify the areas. To this end, in an embodiment of the present invention, the area discrimination unit 5310 may include: an HTML standard identification unit 5311 for obtaining an HTML version of the web page by analyzing an HTML document of the web page; an HTML5 analysis unit 5312 for analyzing the web page based on an HTML5 standard and setting the areas to classify the areas when the HTML version of the web page is HTML5; and an HTML4 analysis unit 5313 for analyzing the web page based on an HTML4 standard and setting the areas to classify the areas when the HTML version of the web page is HTML4.

The score measurement unit 5320 obtains the evaluation scores of the areas classified by the area discrimination unit 5310. The evaluation score is used for estimating an area including the content of interest of the user among the classified areas, and priority of the area is set by the evaluation score.

In an embodiment of the present invention, the evaluation score may be obtained by calculating a percentage of the number of texts and the number of image tags in each of the areas with respect to the number of texts and the number of image tags in an entire document.

The content output unit 5330 sets the region of interest based on the evaluation score obtained from the score measurement unit 5320 among the areas classified by the area discrimination unit 5310, and outputs the content of the region of interest.

The content output unit 5330 sets the region of interest among the areas classified by the area discrimination unit 5310 to output only the content in the region of interest without outputting all the contents in the web page, so that the user may easily recognize the contents of the web page which is a combination of the menu, the body text, the link, the picture, etc.

The link list generation unit 5340 analyzes the areas classified by the area discrimination unit 5310 to extract link information, and generates the link list including the link information. The link information distributed in the web page is configured as a single list as described above, so that the link information may be displayed in a one-dimensional array as shown in FIG. 5, and the link information may be displayed in a form of a one-dimensional list in the tactile interface device 1000.

Figure 11:
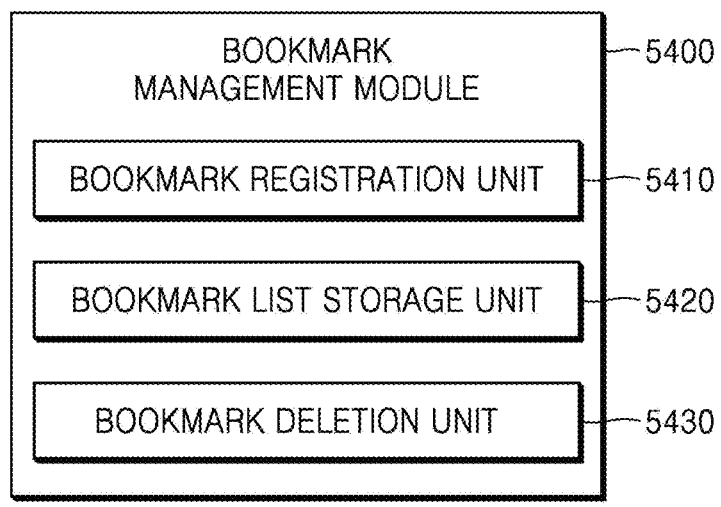
FIG. 11 is a view schematically showing an internal configuration of a bookmark management module according to an embodiment of the present invention.

FIG. 11 is a view schematically showing an internal configuration of a bookmark management module according to an embodiment of the present invention.

In an embodiment of the present invention, the bookmark management module 5400 includes: a bookmark registration unit 5410 for adding information of the web page, which is outputted by the web page conversion module 5300, to the bookmark list; a bookmark list storage unit 5420 for storing the bookmark list; and a bookmark deletion unit 5430 for deleting the information of the web page, which is selected by a user input, from the bookmark list.

The bookmark management module 5400 provides the bookmark list to the user so that the user may easily use web pages that are frequently visited. When the user visits the web page and the web page conversion module 5300 outputs the web page, the bookmark registration unit 5410 adds the information of the web page to the bookmark list according to the user input. In an embodiment of the present invention, the information of the web page may be address information of the web page.

When the bookmark list is outputted to the visual display device and the tactile interface device 1000 by the bookmark management module 5400, the bookmark deletion unit deletes the information of the web page selected by the user input.

Figure 12:
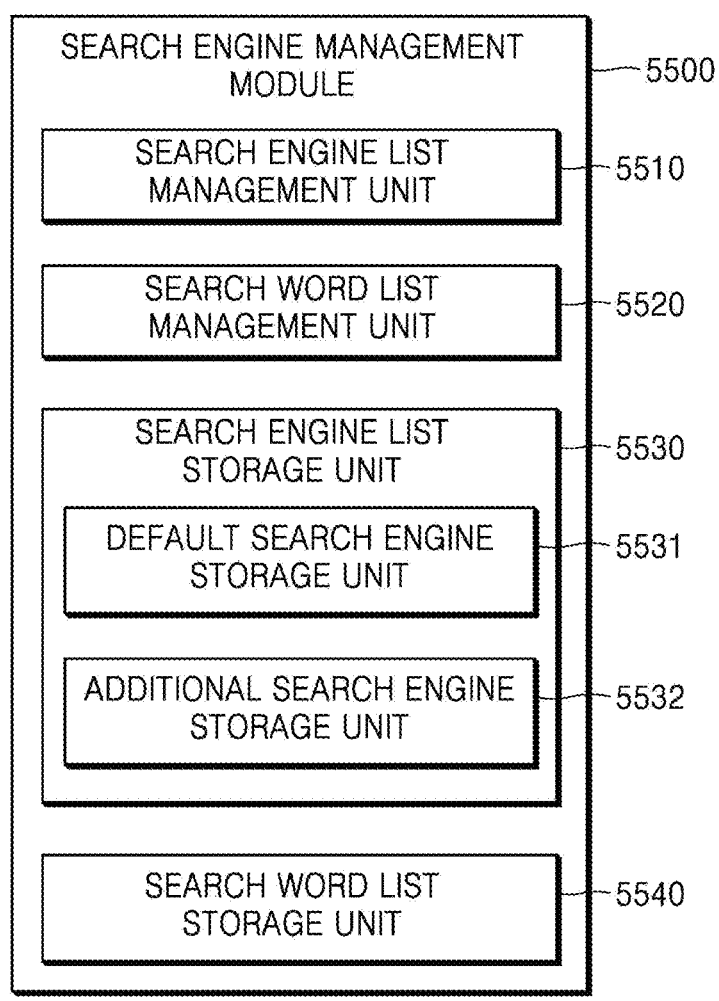
FIG. 12 is a view schematically showing an internal configuration of a search engine management module according to an embodiment of the present invention.

FIG. 12 is a view schematically showing an internal configuration of a search engine management module according to an embodiment of the present invention.

In an embodiment of the present invention, the search engine management module 5500 may include: a search engine list management unit 5510 for providing a search engine list, which is selected by the user and includes information on one or more search engines for internet search, and adding the information on the search engines to the search engine list or deleting the information on the search engines from the search engine list; a search word list management unit 5520 for providing a search word list which is selected by the user, and adding a search word to the search word list or deleting the search word from the search word list; a search engine list storage unit 5530 for storing the search engine list; and a search word list storage unit 5540 for storing the search word list.

The search engine list management unit 5510 manages the search engine list. The search engine list management unit 5510 provides the search engine list to the user so that the user may easily access the search engine through selection. The user may access the search engine by a simple operation by selecting the search engine from the search engine list without inputting the address of the search engine or inputting the information of the search engine.

The search engine list management unit 5500 may add the search engine to the search engine list by the user input or delete the search engine from the search engine list by the user input. Through such addition and deletion, the user may manage the search engine list including information of preferred search engines.

The search word list management unit 5520 manages the search word list. The search word list management unit 5520 provides the search word list to the user so that the user may easily input the search word through selection. When the user inputs the search word to the search engine after accessing the search engine through the search engine list management unit 5510, the user may directly input the search word or select the search word from the search word list.

The search word list management unit 5520 may add the search word to the search word list or delete the search word from the search word list. Such addition or deletion of the search word may be performed by selection of the user, or may be performed by inputting information from an outside. When the information is inputted from the outside to add or delete the search word, the search word list management unit 5620 may directly receive the search word to be added or deleted, or may obtain the search word to be added or deleted by receiving the information from the outside. For example, the search word list management unit 5620 may receive a list of popular search words of the search engine from the search engine to add the list to the search word list, or may obtain a keyword that the user is likely to be interested in from social media or news articles on the internet to add the keyword to the search word list. In a case of obtaining the search word to be added or deleted as described above, the search word may be obtained through an algorithm using an artificial neural network, etc.

The search engine list storage unit 5530 may include a default search engine storage unit 5531 and an additional search engine storage unit 5532. The default search engine storage unit 5531 may store a default search engine list including information of one or more predetermined search engines. The additional search engine storage unit 5532 may store an additional search engine list including information of the search engine selected by the user input. For example, Google, Naver, Yahoo, or the like is stored in the default search engine list as the default search engine, and Daum, Bing, or the like is stored in the additional search engine list by the user input, so that the user may select and use a desired search engine from the search engine list including the default search engine list and the additional search engine list. When the default search engine list and the additional search engine list are separately managed as described above, the search engine list management unit 5500 may add the search engine to the additional search engine list among the search engine lists or delete the search engine from the additional search engine list, so that the default search engine list is prevented from being changed. The default search engine list is protected as described above, so that the user may be prevented from having difficulties in browsing the internet when the user deletes all search engine information by a mistake.

The search word list storage unit 5440 stores the search word list. The search word list management unit 5520 may load the search word list stored in the search word list storage unit 5440 to provide the search word list to the user, and may add the search word to the search word list or delete the search word from the search word list.

Figure 13:
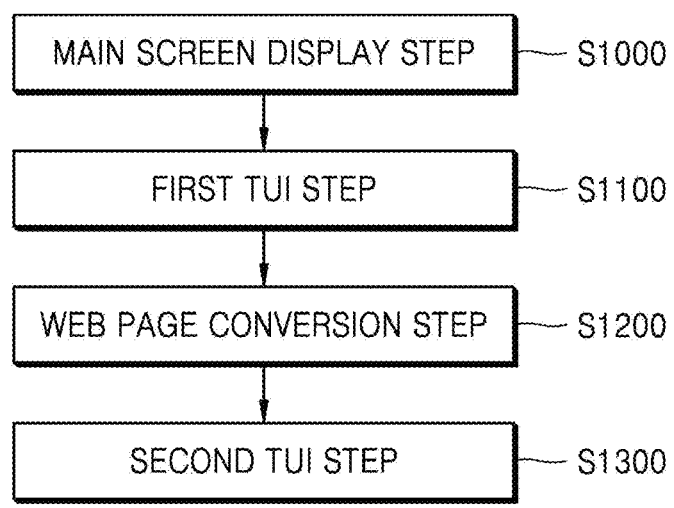
FIG. 13 is a view schematically showing major steps of a method of providing an internet browsing service according to an embodiment of the present invention.

FIG. 13 is a view schematically showing major steps of a method of providing an internet browsing service according to an embodiment of the present invention.

The method of providing the internet browsing service may correspond to a method implemented by a computing device including a processor to provide an internet browsing service through a tactile interface device connected to the computing device to interact with a user, and the method may be implemented by an interactive operation of internal components of the internet browser module described above.

In step S1000, a main screen display step of outputting a browser main screen, which is provided by the internet browser module 5000, to the visual display device connected to the computing device by executing the browser main screen module 5200 in the computing device is performed.

In step S1100, a first TUI step of generating an output signal for implementing a tactile screen of the tactile interface device 1000 corresponding to a screen displayed on the display device by the browser main screen module 5200, and generating an input signal, which is to be inputted to the browser main screen module 5200, from a user input inputted to the tactile interface device 1000 by executing the TUI module 5100 in the computing device is performed.

In step S1200, a web page conversion step of outputting information, which includes the information contained in the web page converted by the web page conversion module 5300, to the visual display device connected to the computing device by executing the web page conversion module 5300 in the computing device is performed.

In step S1400, a second TUI step of generating an output signal for implementing a tactile screen of the tactile interface device 1000 corresponding to a screen displayed on the display device by the web page conversion module 5300, and generating an input signal, which is to be inputted to the web page conversion module 5300, from a user input inputted to the tactile interface device 1000 by executing the TUI module in the computing device is performed.

The first TUI step S1100 and the second TUI step S1200 are names arbitrarily given to distinguish the TUI steps performed by the modules, and the steps are all the same in that the steps are operations of the TUI module 5100.

Figure 14:
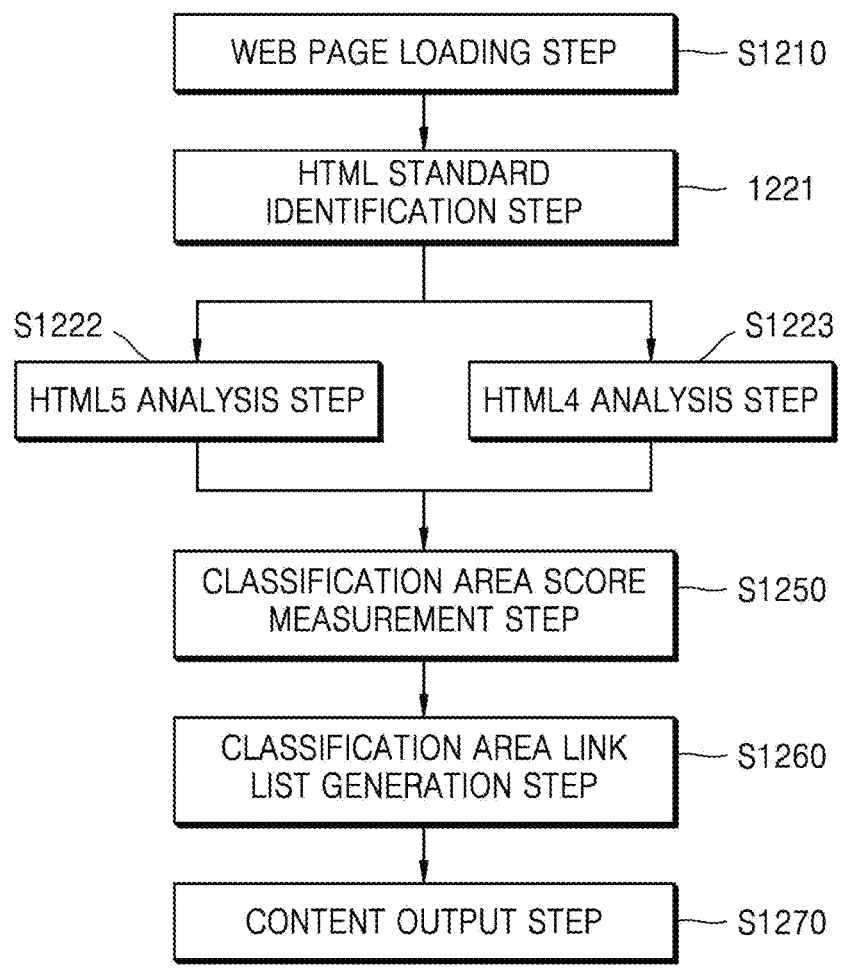
FIG. 14 is a view schematically showing detailed steps of a web page conversion step according to an embodiment of the present invention.

FIG. 14 is a view schematically showing detailed steps of a web page conversion step according to an embodiment of the present invention.

In an embodiment of the present invention, the web page conversion step S1200 includes: a web page loading step S1210 of loading the web page on the internet; an HTML analysis step S1220 of analyzing the web page and setting areas to classify the areas; a classification area score measurement step S1250 of obtaining evaluation scores of the areas classified in the HTML analysis step S1220; a classification area link list generation step S1260 of generating a link list by extracting a link present in the classified areas; and a content output step S1270 of setting a region of interest based on the evaluation scores of the areas, and generating an output signal including a content of the region of interest.

In an embodiment of the present invention, the HTML analysis step S1220 may include: an HTML standard identification step S1221 of obtaining an HTML version of the web page by analyzing an HTML document of the web page; an HTML5 analysis step S1222 of analyzing the web page based on an HTML5 standard and setting the areas to classify the areas when the HTML version of the web page is HTML5; and an HTML4 analysis step S1223 of analyzing the web page based on an HTML4 standard and setting the areas to classify the areas when the HTML version of the web page is HTML5.

In the HTML analysis step S1220, the HTML document of the web page is analyzed to identify the HTML version, and an analysis step corresponding to the identified HTML version is performed, so that the web page may be analyzed more accurately and efficiently.

In the HTML standard identification step S1221, the HTML version may be identified by searching for the presence or absence of a specific tag in the HTML document of the web page. For example, in the HTML standard identification step S1221, it is determined whether the document conforms to the HTML5 standard by searching for the presence or absence of the Header tag which is used in the HTML5 standard as a sub-tag of a Body tag in the document. In the HTML standard identification step S1221, the HTML version of the document may be identified by searching for the presence or absence of the Article tag, the Section tag, or the like used in the HTML5 standard as well as the Header tag as described above.

In the HTML analysis step S1220, the HTML5 standard document is analyzed through the HTML5 analysis step S1222 when the HTML version of the web page identified in the HTML standard identification step S1221 is HTML5, and the HTML4 standard document is analyzed through the HTML4 analysis step S1223 when the HTML version of the identified web page is HTML4.

In an embodiment of the present invention, in the HTML4 analysis step S1223, the web page may be analyzed when the HTML version is HTML4 or less as well as when the HTML version of the web page is HTML4.

In the classification area score measurement step S1250, the evaluation scores of the areas classified in the HTML analysis step S1220 are obtained. The evaluation score is used for estimating an area including the content of interest of the user among the classified areas, and priority of the area is set by the evaluation score.

In an embodiment of the present invention, the evaluation score may be obtained by calculating a percentage of the number of texts and the number of image tags in each of the areas with respect to the number of texts and the number of image tags in an entire document.

In the classification area link list generation step S1260, the classified areas are analyzed to extract link information, and a link list including the link information is generated. The link information distributed in the web page is configured as a single list as described above, so that the link information may be displayed in a one-dimensional array as shown in FIG. 5, and the link information may be displayed in a form of a one-dimensional list in the tactile interface device 1000.

In the content output step S1270, the region of interest is set, and the content of the region of interest is outputted. At this time, when the link list generated in the classification area link list generation step S1260 is present in the region of interest, an output signal including the link list is generated.

In the content output step S1270, the region of interest is set among the areas classified in the HTML analysis step S1220 to output only the content in the region of interest without outputting all the contents in the web page, so that the user may easily recognize the contents of the web page which is a combination of the menu, the body text, the link, the picture, etc.

Figure 15:
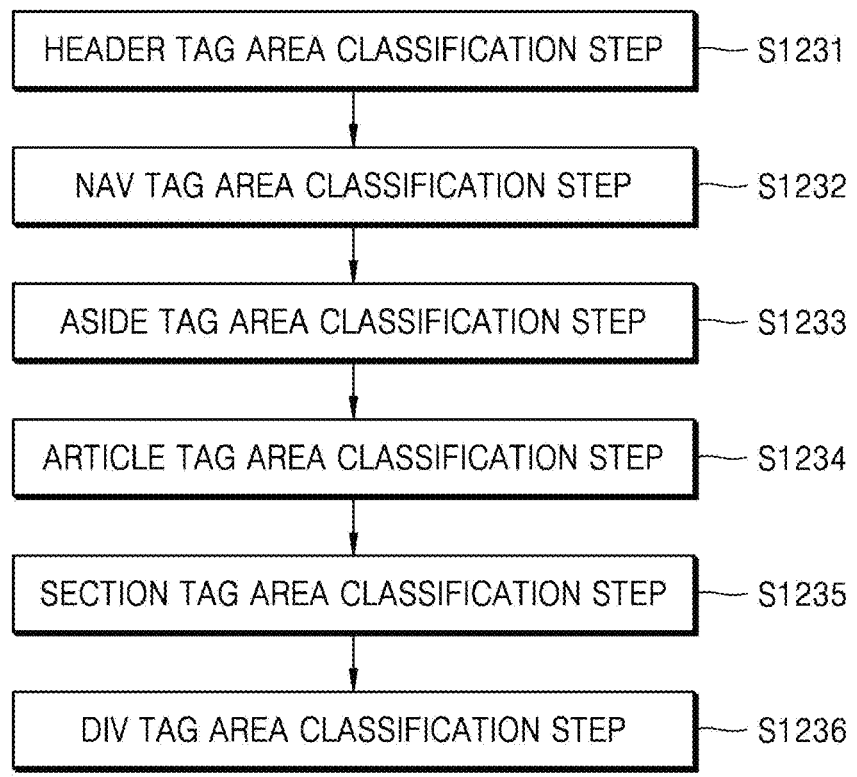
FIG. 15 is a view schematically showing detailed steps of an HTML5 analysis step according to an embodiment of the present invention.

FIG. 15 is a view schematically showing detailed steps of an HTML5 analysis step according to an embodiment of the present invention.

The HTML5 analysis step S1222 may include one or more of: a Header tag area classification step S1231 of identifying presence or absence of a Header tag in the web page and setting an area for the Header tag when the Header tag is present; a Nav tag area classification step S1232 of identifying presence or absence of a Nav tag in the web page and setting an area for the Nav tag when the Nav tag is present; an Aside tag area classification step S1233 of identifying presence or absence of an Aside tag in the web page and setting an area for the Aside tag when the Aside tag is present; an Article tag area classification step S1234 of identifying presence or absence of an Article tag in the web page and setting an area for the Article tag when the Article tag is present; a Section tag area classification step S1235 of identifying presence or absence of a Section tag in the web page and setting an area for the Section tag when the Section tag is present; and a Div tag area classification step S1236 of identifying presence or absence of a Div tag in the web page and setting an area for the Div tag when the Div tag is present.

The Header tag represents an introduction or navigation area in the HTML document, the Nav tag refers to a section for navigation, the Aside tag refers to an additional content having small relation with a body text page, the Article tag refers to an independent document such as a blog article or a newspaper article, the Section tag refers to a section of the document, and the Div tag creates the section of the document or divides the document into areas. The above tags define a structure of the HTML5 standard document, and the above tags are used to set the areas to classify the areas, so that the areas may be classified more efficiently and accurately.

Figure 16:
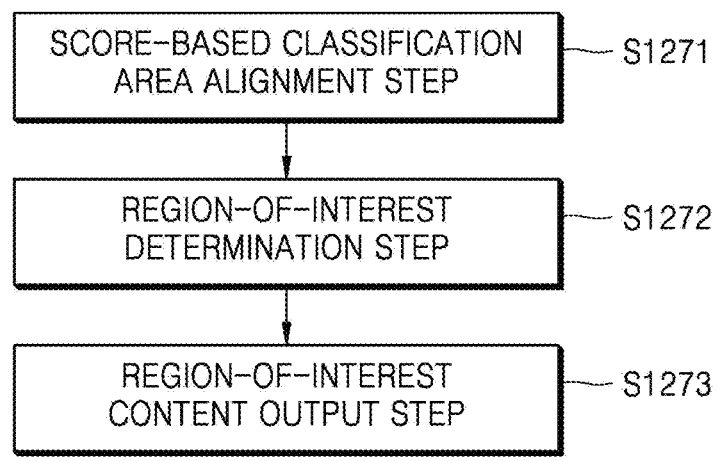
FIG. 16 is a view schematically showing detailed steps of a content output step according to an embodiment of the present invention.

FIG. 16 is a view schematically showing detailed steps of a content output step according to an embodiment of the present invention.

In an embodiment of the present invention, the content output step S1270 may include: a score-based classification area alignment step S1271 of aligning the classified areas based on the evaluation scores; a region-of-interest determination step S1272 of setting an area, which has a highest evaluation score among the classified areas, as the region of interest; and a region-of-interest content output step S1273 of generating the output signal including the content of the region of interest.

In an embodiment of the present invention, in the score-based classification area alignment step S1271, the areas are aligned based on the evaluation scores of the areas classified in the classification area score measurement step S1250. The evaluation score is used for estimating an area including the content of interest of the user among the classified areas, and the area with a high evaluation score have a high probability of including the content of interest of the user. Accordingly, in an embodiment of the present invention, in the score-based classification area alignment step S1271, the areas are aligned in descending order of the evaluation scores so that the user may confirm the areas in descending order of the evaluation scores.

In the region-of-interest determination step S1272, the area which has the highest evaluation score among the classified areas is set as the region of interest. Since the region with the highest evaluation score has the highest probability of including the content of interest of the user, the region with the highest evaluation score is firstly set as the region of interest. The region of interest may be changed by the user input. Accordingly, the user may confirm the content of the web page by moving the region of interest in an order of the areas aligned in the score-based classification area alignment step S1271.

In the region-of-interest content output step S1273, the content of the region of interest determined in the region-of-interest determination step S1272 is outputted. Since only the content of the region of interest having a high probability of including the content of interest is outputted as described above, in a case where the output content is converted into the tactile screen of the tactile interface device 1000, the visually impaired person may easily recognize the content.

In the region-of-interest content output step S1273, in a case where the link list generated in the classification area link list generation step S1260 is present in the region of interest, the information including the link list may be outputted so that the user may select a link from the link list to use a linked content.

Figure 17:
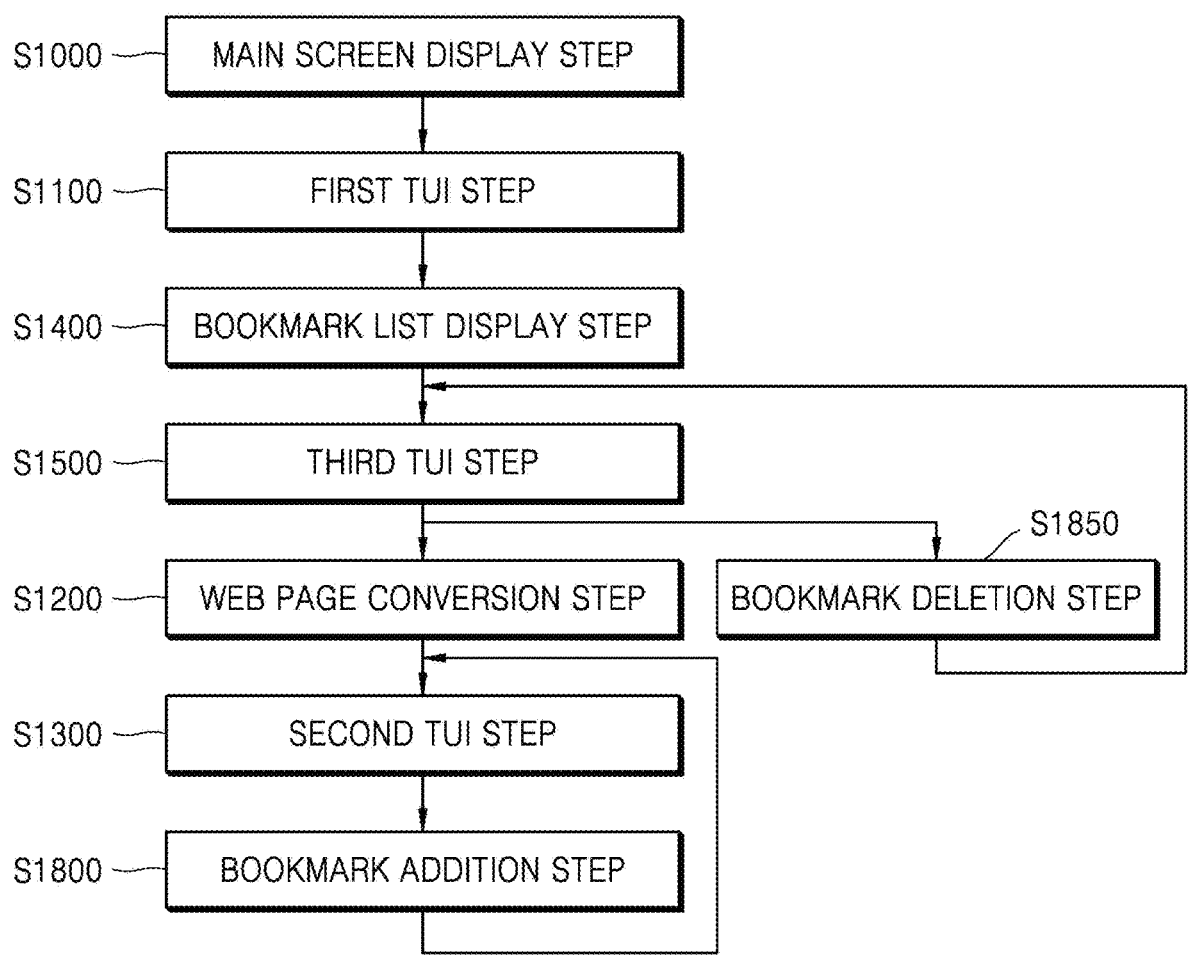
FIG. 17 is a view schematically showing major steps of a method of providing an internet browsing service by using a bookmark according to an embodiment of the present invention.

FIG. 17 is a view schematically showing major steps of a method of providing an internet browsing service by using a bookmark according to an embodiment of the present invention.

In step S1400, a bookmark list display step of outputting information including a stored bookmark list to the visual display device connected to the computing device when the bookmark management module 5400 is executed in the computing device by the user input in step S1100 is performed. The bookmark list is created by the selection of the user and includes information on one or more specific web pages on the internet.

In step S1500, a third TUI step of generating an output signal for implementing a tactile screen of the tactile interface device corresponding to a screen displayed on the display device by the bookmark management module, and generating an input signal, which is to be inputted to the bookmark management module, from a user input inputted to the tactile interface device by executing the TUI module in the computing device is performed.

In step S1500, when one web page is selected from the bookmark list by the user input and the web page is loaded, the web page conversion step S1200 and the second TUI step S1300 are performed in the same manner as in FIG. 13.

Through the above steps, the user loads the bookmark list on the browser main screen and selects one of the web pages from the bookmark list to move to the selected web page, so that the user may easily access web pages that are frequently used.

The user may use the web page by various schemes as described above. In addition, when the user desires to add a currently used web page to the bookmark list while using the web page, the user may perform a bookmark addition step S1800 of adding the web page, which is outputted by the web page conversion step S1200, to the bookmark list. The user may add information of the currently used web page to the bookmark list by inputting an instruction for adding the web page to the bookmark list in the second TUI step S1300. In an embodiment of the present invention, the information of the web page may be an address of the web page.

In addition, when the user desires to delete the web page which is not used from the bookmark list, the user may perform a bookmark deletion step S1850 of deleting a bookmark, which is selected by a user input, from the bookmark list outputted by the bookmark list display step S1400. The user may delete the information of the web page from the bookmark list by selecting a web page to be deleted from the bookmark list outputted in the third TUI step S1500 and inputting an instruction for deleting the web page from the bookmark list.

Figure 18:
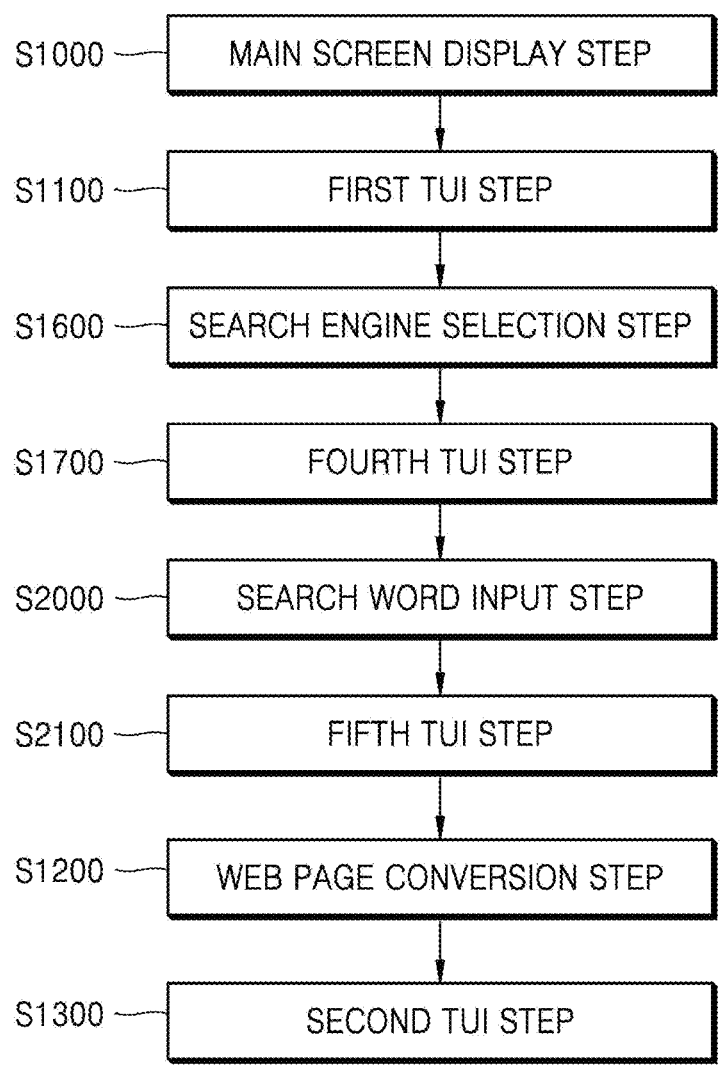
FIG. 18 is a view schematically showing major steps of a method of providing an internet browsing service by using a search engine according to an embodiment of the present invention.

FIG. 18 is a view schematically showing major steps of a method of providing an internet browsing service by using a search engine according to an embodiment of the present invention.

The main screen display step S1000 and the first TUI step S1100 are the same as the steps described with reference to FIG. 13, so the detailed description thereof will be omitted.

In step S1600, a search engine selection step of outputting information including the search engine list stored in the search engine management module to the visual display device connected to the computing device by executing the search engine management module in the computing device by the user output in step S1100 is performed.

In step S1700, a fourth TUI step of generating an output signal for implementing a tactile screen of the tactile interface device corresponding to a screen displayed on the display device by the search engine management module, and generating an input signal, which is to be inputted to the search engine management module, from a user input inputted to the tactile interface device, by executing the TUI module in the computing device is performed.

In step S2000, a search word input step of inputting a search word to be searched into a search engine which is selected in the search engine selection step S1600 is performed. In the search word input step S2000, the user may directly input the search word or select the search word from a pre-stored search word list.

In step S2100, a fifth TUI step of generating an output signal for implementing a tactile screen of the tactile interface device corresponding to a screen displayed on the display device by the search engine management module, and generating an input signal, which is to be inputted to the search engine management module, from a user input inputted to the tactile interface device by executing the TUI module in the computing device is performed.

In step S2100, when the search word is searched in the search engine by the user input to load a web page including a search result, the web page conversion step S1200 and the second TUI step S1300 are performed in the same manner as in FIG. 13.

Through the above steps, the user may access the web page including the search result of the search word to use the content of the web page by selecting the search engine from the search engine list on the browser main screen and inputting the search word into the selected search engine.

Figure 19:
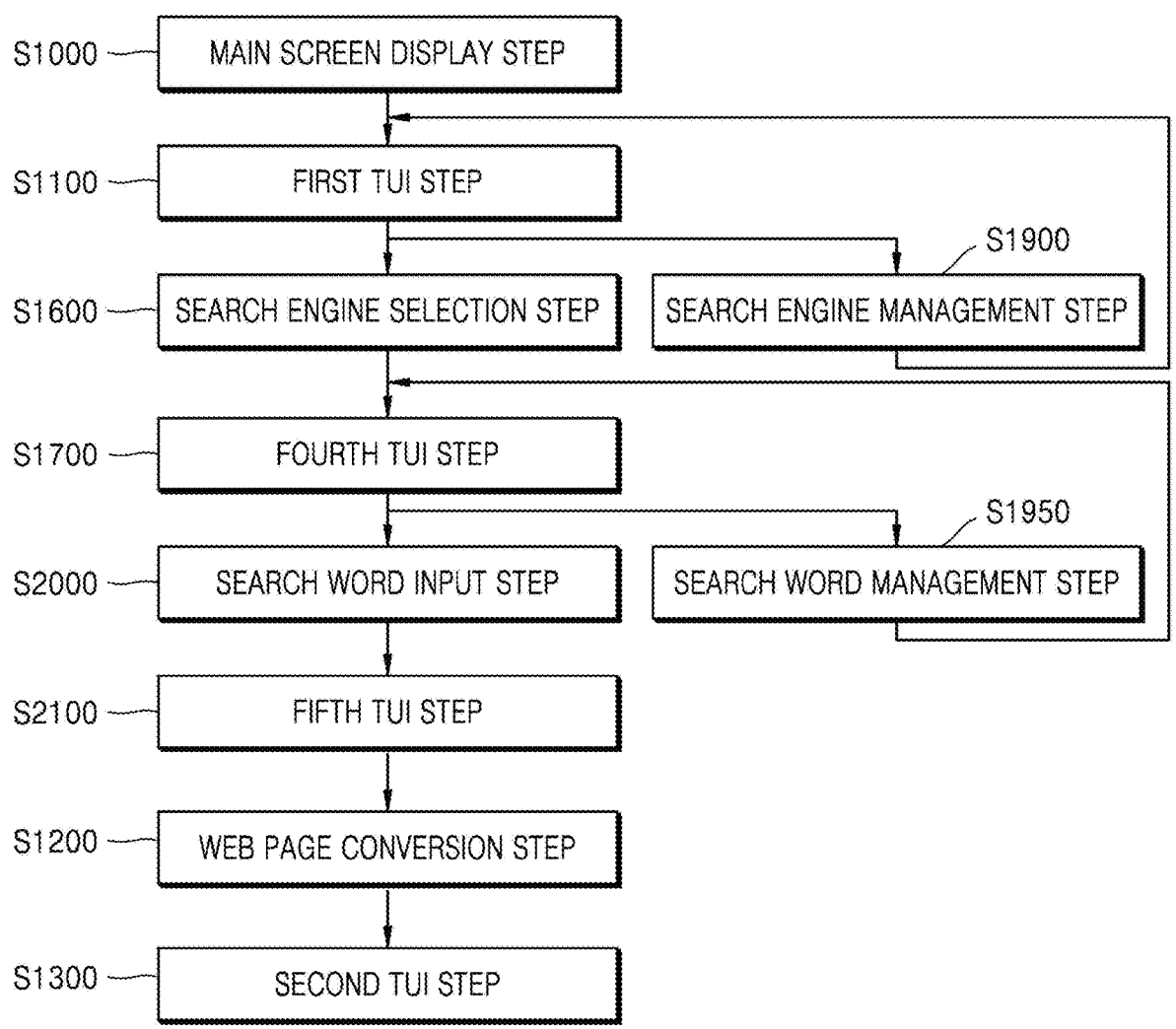
FIG. 19 is a view schematically showing the major steps of the method of providing the internet browsing service by using the search engine according to an embodiment of the present invention.

FIG. 19 is a view schematically showing the major steps of the method of providing the internet browsing service by using the search engine according to an embodiment of the present invention.

In FIG. 19, through the main screen display step S1000, the first TUI step S1100, the search engine selection step S1600, the fourth TUI step S1700, the search word input step S2000, the fifth TUI step S2100, the web page conversion step S1200, and the second TUI step S1300, the user may access the web page including the search result of the search word to use the content of the web page by selecting the search engine from the search engine list on the browser main screen and inputting the search word into the selected search engine.

In this case, the user may edit the search engine list according to preference of the user. To this end, a search engine management step S1900 of adding the search engine to the search engine list or deleting the search engine from the search engine list may be performed. Through such addition and deletion, the user may manage the search engine list including information of preferred search engines.

In the search engine management step S1900, the browser main screen is displayed in the main screen display step S1000, and the search engine may be added or deleted by the user input in the first TUI step S1100. The user may select the search engine displayed on the browser main screen to delete the search engine, or select a search engine addition item to input the information of the search engine. After the search engine list is updated in the search engine management step S1900, the search engine list displayed on the tactile interface device 1000 may be updated through the first TUI step S1100.

In an embodiment of the present invention, the search engine list may include: a default search engine list including information of one or more predetermined search engines; and an additional search engine list including information of a search engine selected by a user input, and, in the search engine management step S1900, the search engine may be added to the additional search engine list among the search engine lists, or the search engine may be deleted from the additional search engine list. The default search engine list and the additional search engine list are separately stored, and the default search engine list is protected as described above, so that the user may be prevented from having difficulties in browsing the internet when the user deletes all search engine information by a mistake.

In addition, a search word management step S1950 of adding the search word to the search word list or deleting the search word from the search word list may be performed to edit the search word list. Such addition or deletion of the search word may be performed by selection of the user, or may be performed by inputting information from an outside. When the information is inputted from the outside to add or delete the search word, in the search word management step S1950, the search word to be added or deleted may be directly received, or the information may be received from the outside to obtain the search word to be added or deleted. For example, the search word list management unit 5620 may receive a list of popular search words of the search engine from the search engine to add the list to the search word list, or may obtain a keyword that the user is likely to be interested in from social media or news articles on the internet to add the keyword to the search word list. In a case of obtaining the search word to be added or deleted as described above, the search word may be obtained through an algorithm using an artificial neural network, etc.

In the search word management step S1950, the search engine is selected in the search engine selection step S1600, and the search word is added or deleted by the user input in the fourth TUI step S1700.

FIGS. 20A and 20B are views showing browser main screens displayed by a browser main screen module according to an embodiment of the present invention.

FIG. 20A is a view showing a display screen of the computing device in a main screen module execution step S20 of a method of controlling the tactile interface device, and FIG. 20B is a view showing a display screen of the computing device in the main screen display step S1000 of the method of providing the internet browsing service through the tactile interface device.

The user may call and execute the internet browser module 5000 by selecting an item shown as ① in the main screen as shown in FIG. 20A.

The browser main screen module 5200 provides an interface displayed on the computing device A as shown in FIG. 20B. In other words, when the browser main screen module 5200 is executed, the visual display device connected to the computing device displays a GUI interface as shown in FIG. 20B. At the same time, an output signal of the GUI interface is converted into an output signal of the tactile interface by the TUI module 5100, and the converted output signal is transmitted to the tactile interface device 1000, so that the visually impaired person may recognize the main screen with a tactile sense.

In a case of the visually impaired person, since it is more advantageous to fix a start page, when the internet browser module 5000 is executed, a preset browser main screen as shown in FIG. 20B is displayed. The browser main screen may include page information of the browser main screen displayed on the display module shown as ②, and items shown as ③ for calling and executing the bookmark management module 5500 and the search engine management module 5600.

Since the browser main screen module 5200 is basically displayed in a visual manner, the developers may develop the internet browser module 5000 in a general way without considering the braille or the visually impaired person. In addition, when the visually impaired person has a problem in using the internet browser module 5000, an ordinary person nearby the visually impaired person may solve the problem caused while the visually impaired person uses the application by manipulating general interface elements (e.g., touch display) connected to the computing device.

Figure 21A:
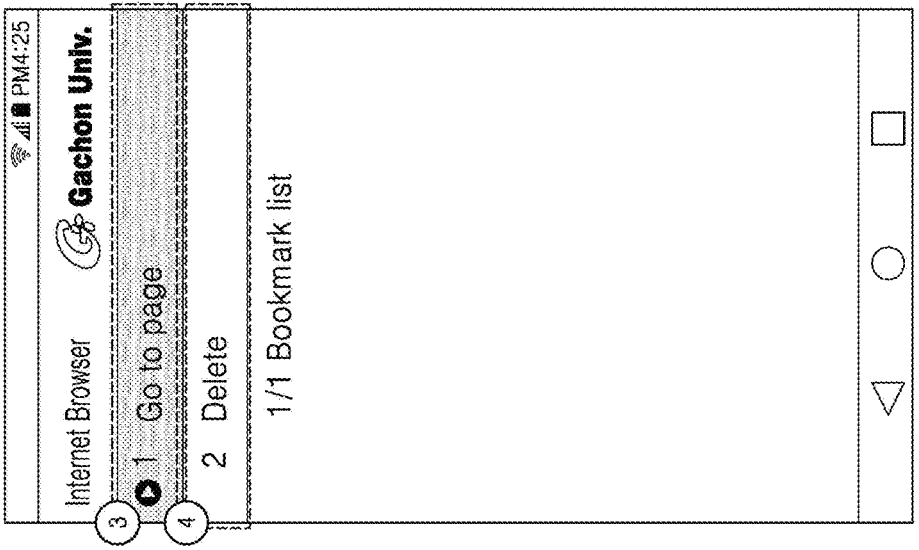
FIGS. 21A-21C are views showing screens displayed by the bookmark management module according to an embodiment of the present invention.
Figure 21B:
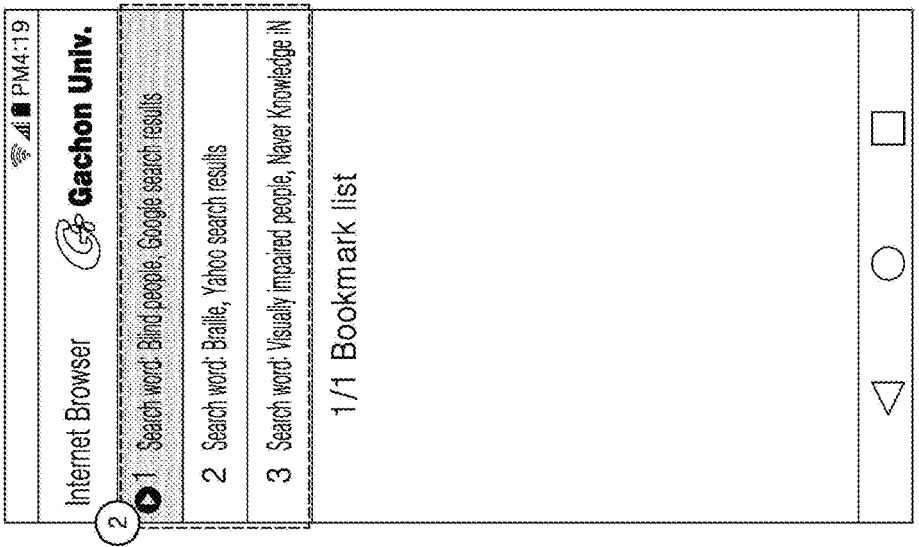
Figure 21C:
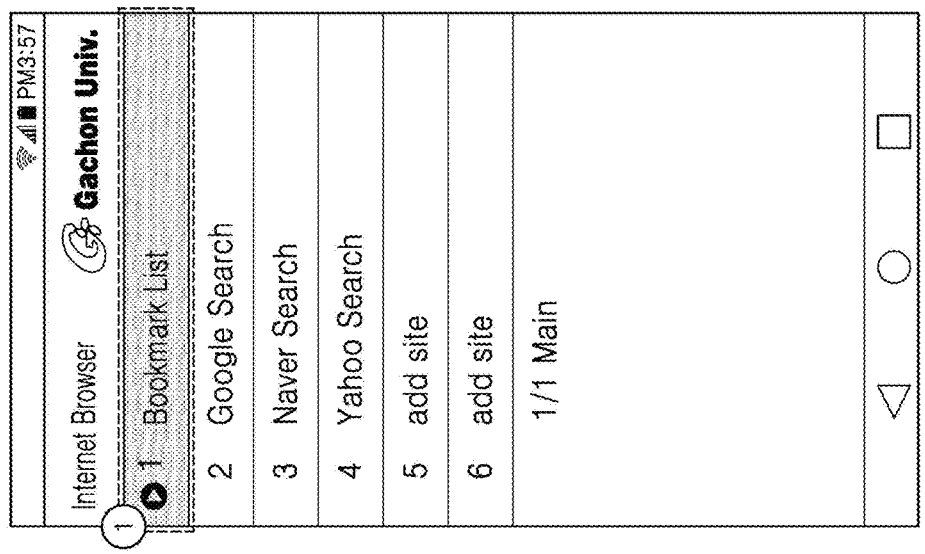

FIGS. 21A-21C are views showing screens displayed by the bookmark management module according to an embodiment of the present invention.

FIG. 21A is a view showing a display screen of the computing device in the main screen display step S1000, FIG. 21B is a view showing a display screen of the computing device in the bookmark list display step S1400, and FIG. 21C is a view showing a display screen of the computing device in the bookmark deletion step S1850.

The user may call and execute the bookmark management module 5400 by selecting an item ① on the browser main screen as shown in FIG. 21A.

The bookmark management module 5400 provides an interface displayed on the computing device A as in FIG. 21B. The interface displayed by the bookmark management module 5400 includes a bookmark list shown as ②, which is created by the selection of the user and includes information on one or more specific web pages on the internet. The user selects the web pages from the bookmark list as described above, so that the user may easily move to web pages that are frequently used.

When the user selects a specific web page from the bookmark list as shown in FIG. 21B, there is provided an interface including an item shown as ③ in FIG. 21C to move to the selected web page, and an item shown as ④ to delete the information of the selected web page from the bookmark list. Through the above items, the user may move to the selected web page or delete the information of the web page selected from the bookmark list.

Figure 22B:
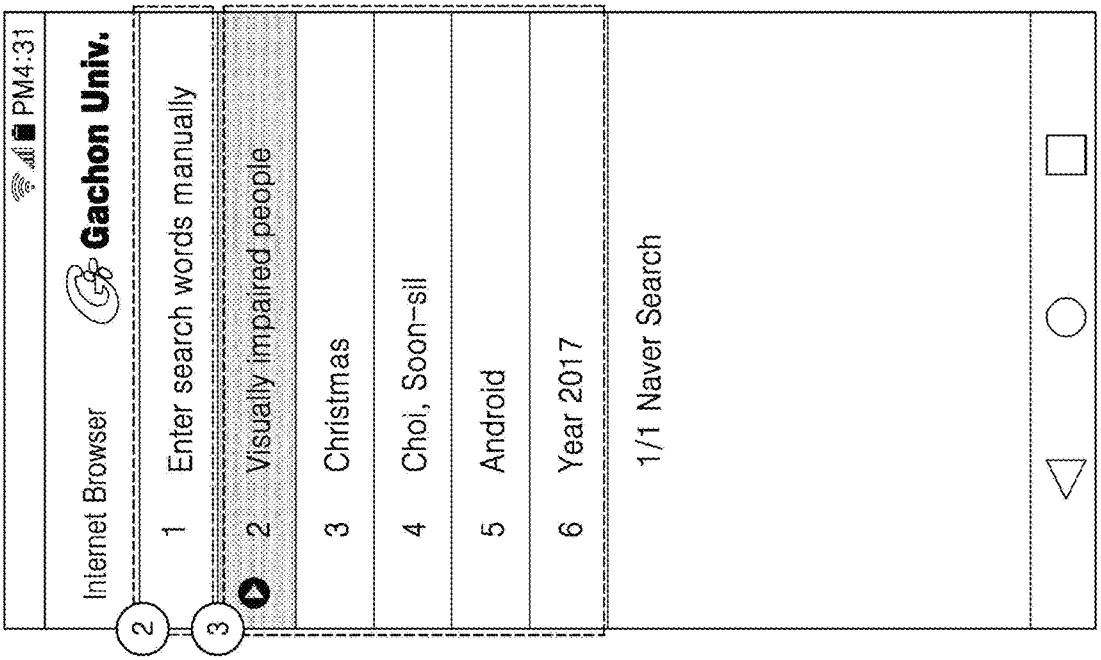
FIGS. 22A and 22B are views showing screens displayed by the search engine management module according to an embodiment of the present invention.
Figure 22A:
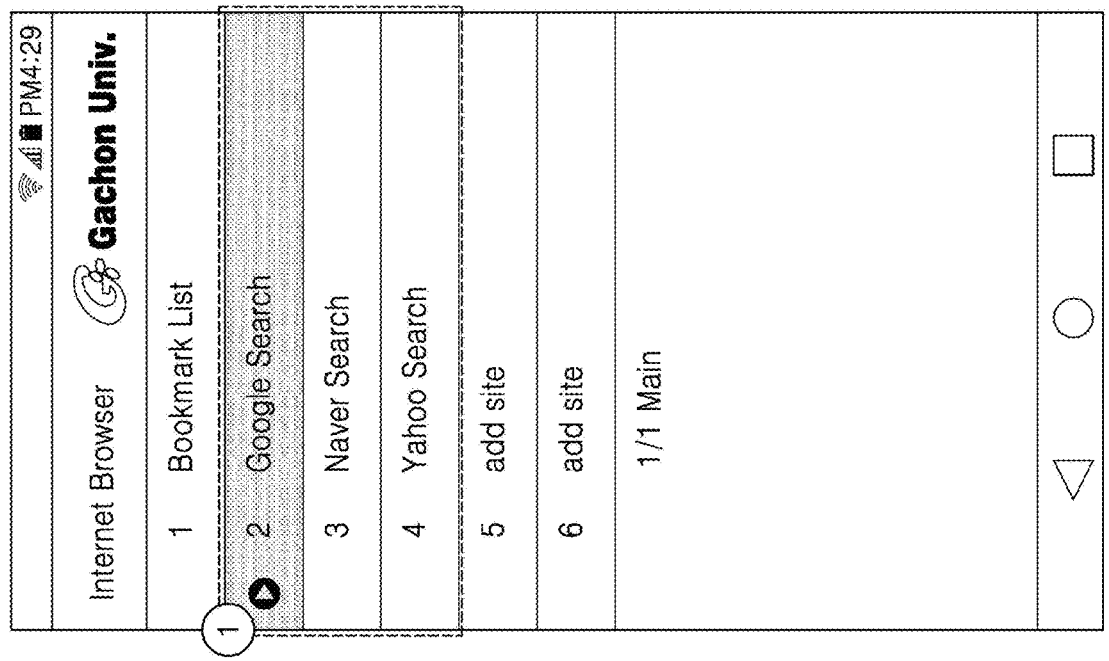

FIGS. 22A and 22B are views showing screens displayed by the search engine management module according to an embodiment of the present invention.

FIG. 22A is a view showing a display screen of the computing device in the main screen display step S1000, and FIG. 22B is a view showing a display screen of the computing device in the search word input step S2000.

The user may call and execute the search engine management module 5500 by selecting one search engine from the search engine list shown as ① on the browser main screen as shown in FIG. 21A.

The bookmark management module 5400 provides the search engine list which is included and displayed on the browser main screen as shown in FIG. 21A. The search may be easily performed through the search engine by selecting the search engine from the search engine list provided by the bookmark management module 5400.

When the user selects the search engine, there is provided an interface including an item shown as ② in FIG. 22B to directly input the search word, and a search word list shown as ③ which is selected by the user. Through the above items, the user may directly input the search word to perform the search or may search the search engine for the search word selected from the search word list.

Figure 23A:
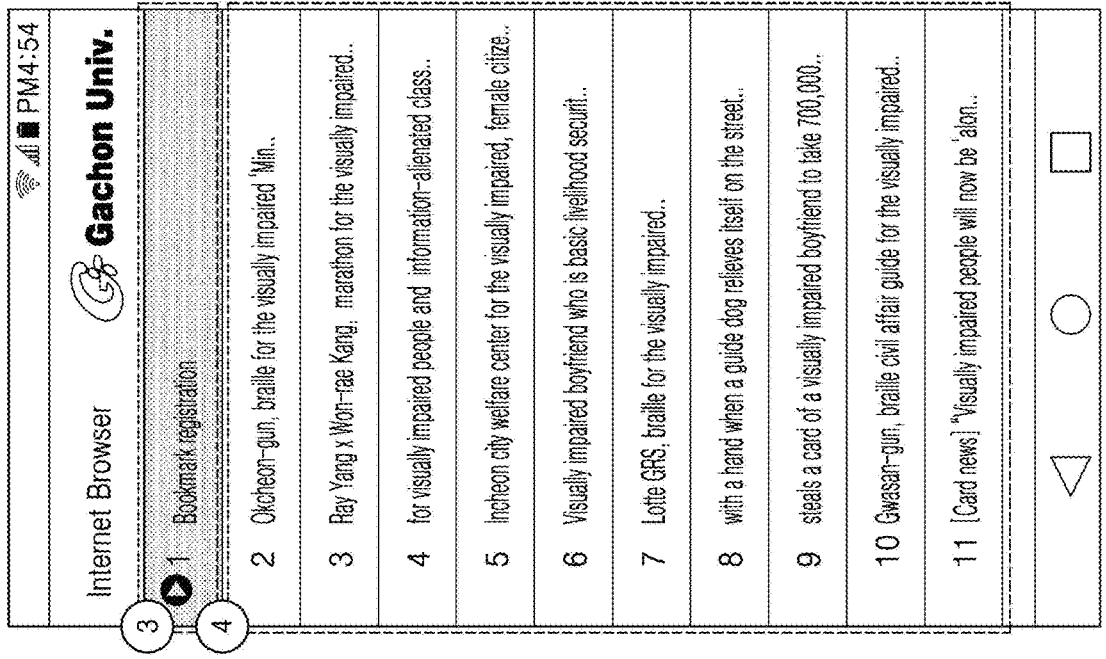
FIGS. 23A and 23B are views showing screens displayed by the search engine management module and the bookmark management module according to an embodiment of the present invention.
Figure 23B:
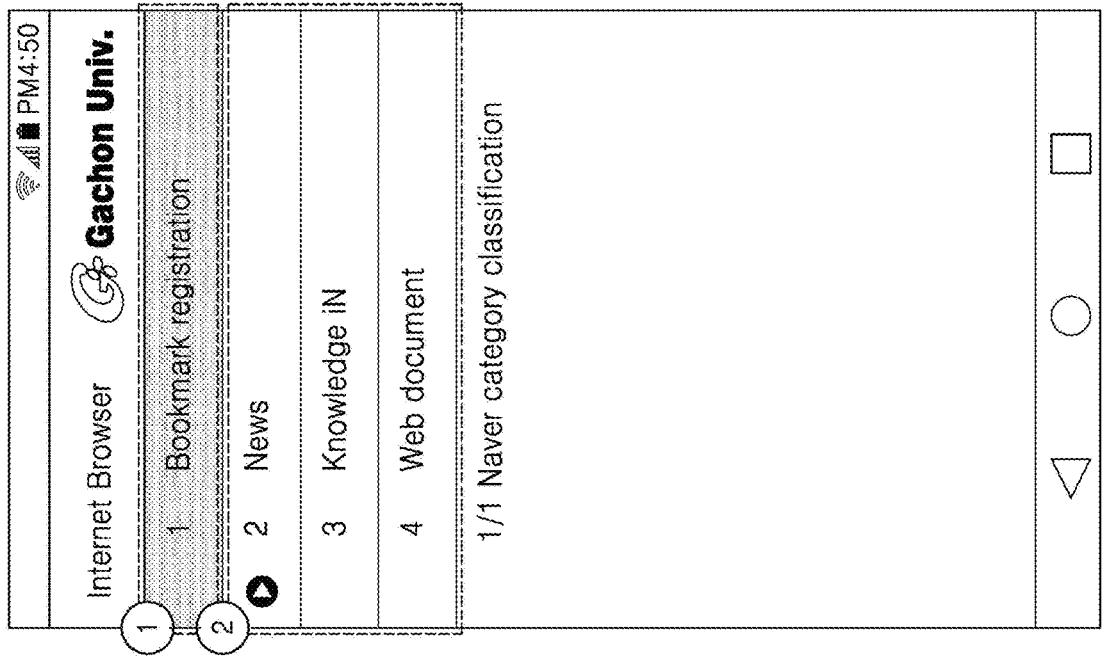

FIGS. 23A and 23B are views showing screens displayed by the search engine management module and the bookmark management module according to an embodiment of the present invention.

FIG. 23A is a view showing a display screen of the computing device to which results of performing the search through the search word input step S2000 are outputted, and FIG. 23B is a view showing a display screen of the computing device when a news category is accessed among results of the search.

Some search engines categorize the search results to show the categorized search results to the user. FIGS. 23A and 23B are views showing display screens when a search word 'visually impaired people' is searched through Naver which is one example of a portal service.

When the user performs the search through Naver, there is provided an interface including an item shown as ① in FIG. 23A to add a current output page to the bookmark list, and an item shown as ② to select the categorized search results. FIG. 23A is a view showing a screen for displaying the search results classified into categories of news, Knowledge iN, and web documents.

The user may add a search result page classified into the categories to the bookmark list through the bookmark addition step S1800 by selecting an item of ①, or may confirm the search result corresponding to a selected category by selecting one from a list of ②.

FIG. 23B is a view showing an output screen when the news category is selected from the list of ②. When the user selects the news category from the categorized search results, there is provided an interface including an item shown as ③ in FIG. 23B to add the current output page to the bookmark list, and a search result list shown as ④ in the news category.

The user may add the search result page in the news category to the bookmark list through the bookmark addition step S1800 by selecting the item of ③, or may confirm the web page obtained from the search result by selecting one from the list of ④.

Figure 24B:
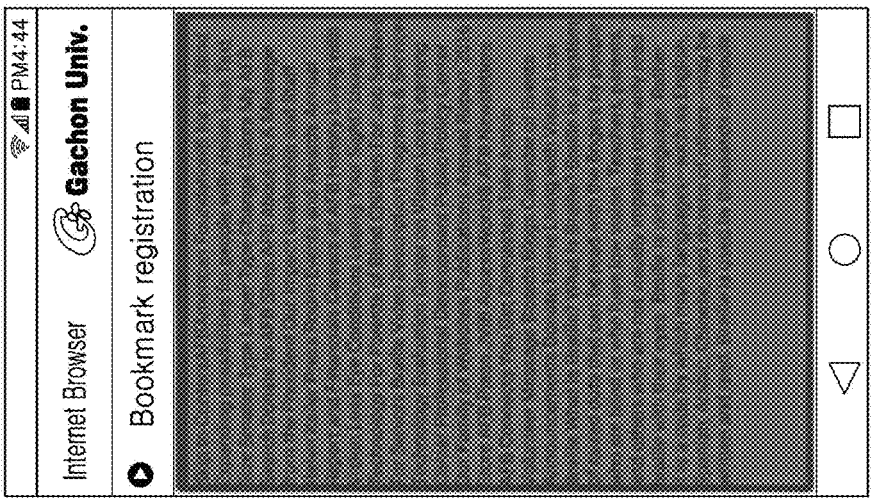
FIGS. 24A and 24B are views showing screens in which a text content of a web page is displayed on a browser without being subject to the web page conversion module.
Figure 24A:
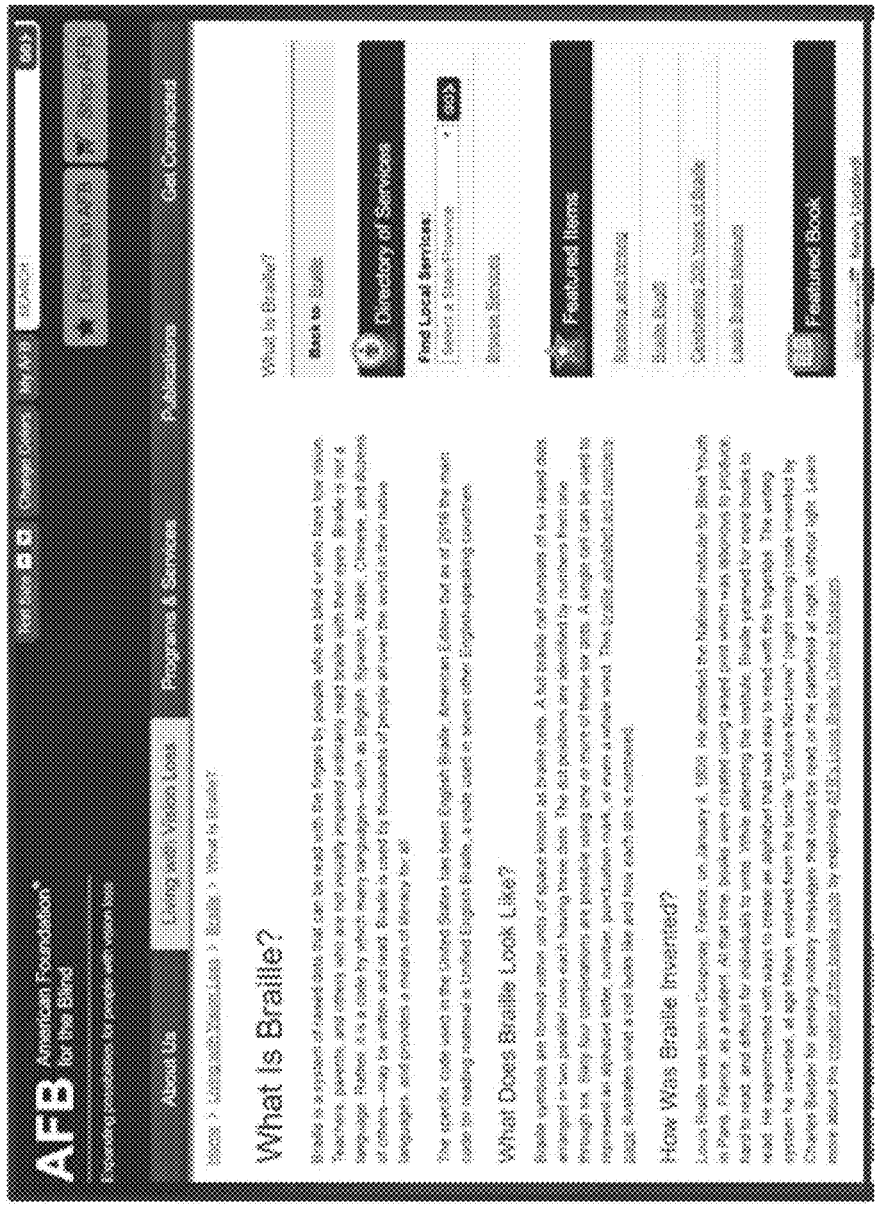

FIGS. 24A and 24B are views showing screens in which a text content of a web page is displayed on a browser without being subject to the web page conversion module.

FIG. 24A is a view showing a general web page, and FIG. 24B is a view showing a state in which a text of the web page is outputted as contents of the internet browser module according to an embodiment of the present invention.

In a case of a general web page, a menu, a body text, a link, a picture, and the like are combined in the web page as shown in FIG. 24A, so that it is difficult for the visually impaired person to recognize the contents when a text of the web page is extracted and translated into braille to allow the visually impaired person to recognize the text.

Accordingly, when the contents are extracted and outputted from the web page shown in FIG. 24A by the internet browser module 5000 according to an embodiment of the present invention, the contents become enumerated texts that are difficult to understand as shown in FIG. 24B. Therefore, it is necessary to separate and extract a part containing a major content in the web page.

Figure 25B:
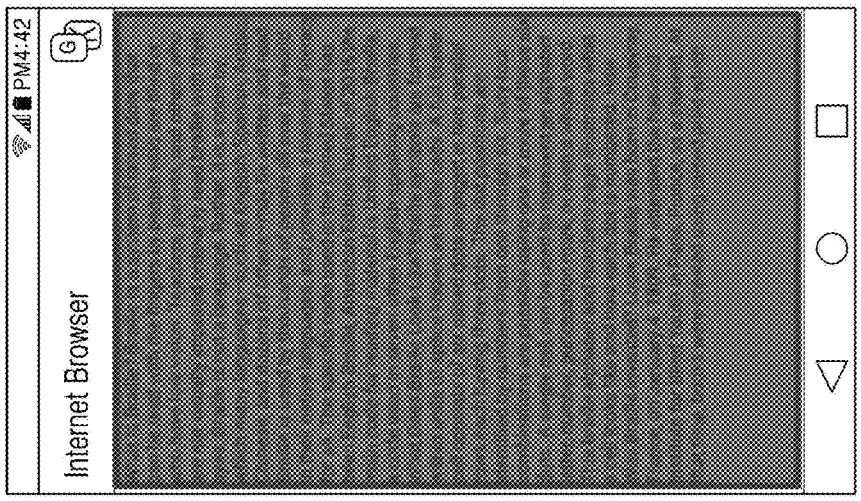
FIGS. 25A and 25B are views showing screens in which the text content of the web page is displayed on the browser through the web page conversion module according to an embodiment of the present invention.
Figure 25A:
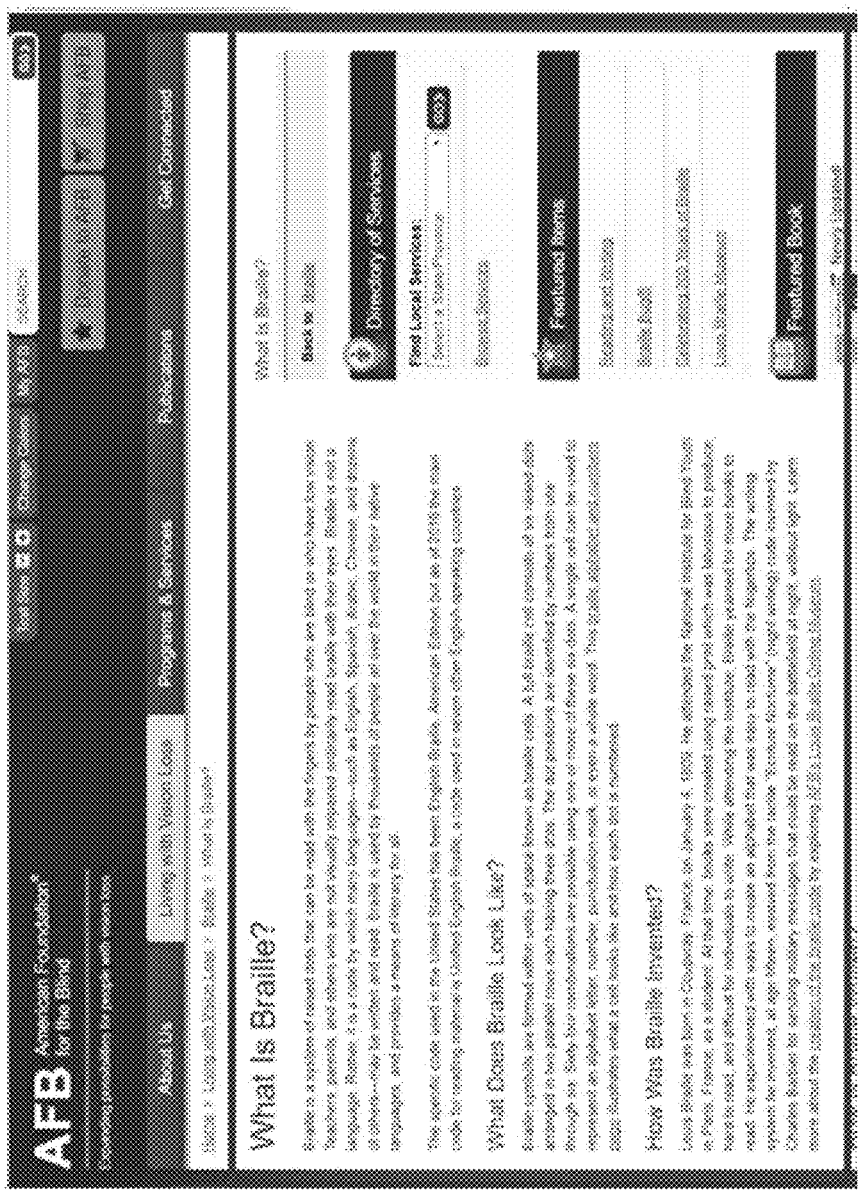

FIGS. 25A and 25B are views showing screens in which the text content of the web page is displayed on the browser through the web page conversion module according to an embodiment of the present invention.

FIG. 25A is a view showing a general web page, and FIG. 25B is a view showing a state in which the text of the web page is outputted as the contents of the internet browser module according to an embodiment of the present invention.

The web page conversion module 5300 according to an embodiment of the present invention analyzes the web page and sets areas to classify the areas. FIG. 25A is a view showing a state in which an area including a body text content except for a top title and a menu of the web page is divided (red box) by the area discrimination unit 5310 of the web page conversion module 5300. The web page conversion module 5300 may set various areas such as the top title, the menu, and the like in addition to an area indicated by a red box.

At this time, the web page conversion module 5300 measures scores of divided areas to set a region of interest which is likely to include a content of interest and outputs a content of the region of interest as shown in FIG. 25B by the score measurement unit 5320 and the content output unit 5330.

As described above, the area including the major content that the user may be interested in, that is, the content of interest is classified and outputted, so that the user may easily acquire desired information in a complex web page.

Figure 26B:
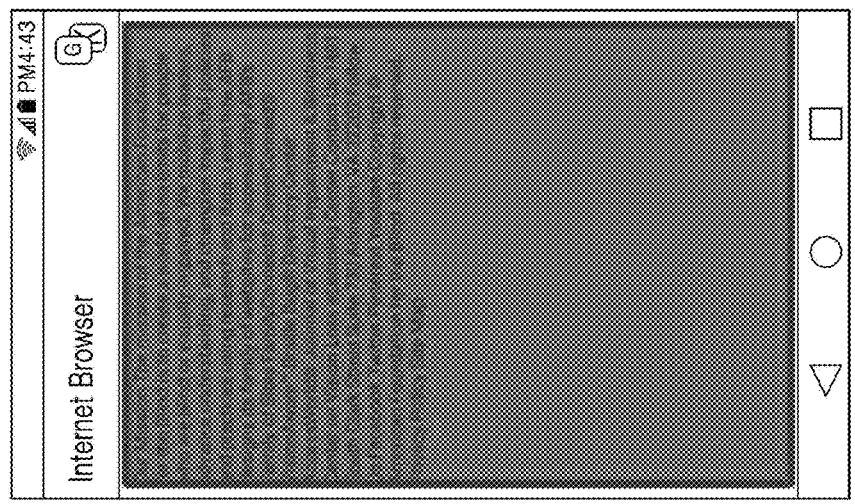
FIGS. 26A and 26B are views showing screens in which the text content of the web page is displayed on the browser through the web page conversion module according to an embodiment of the present invention.
Figure 26A:
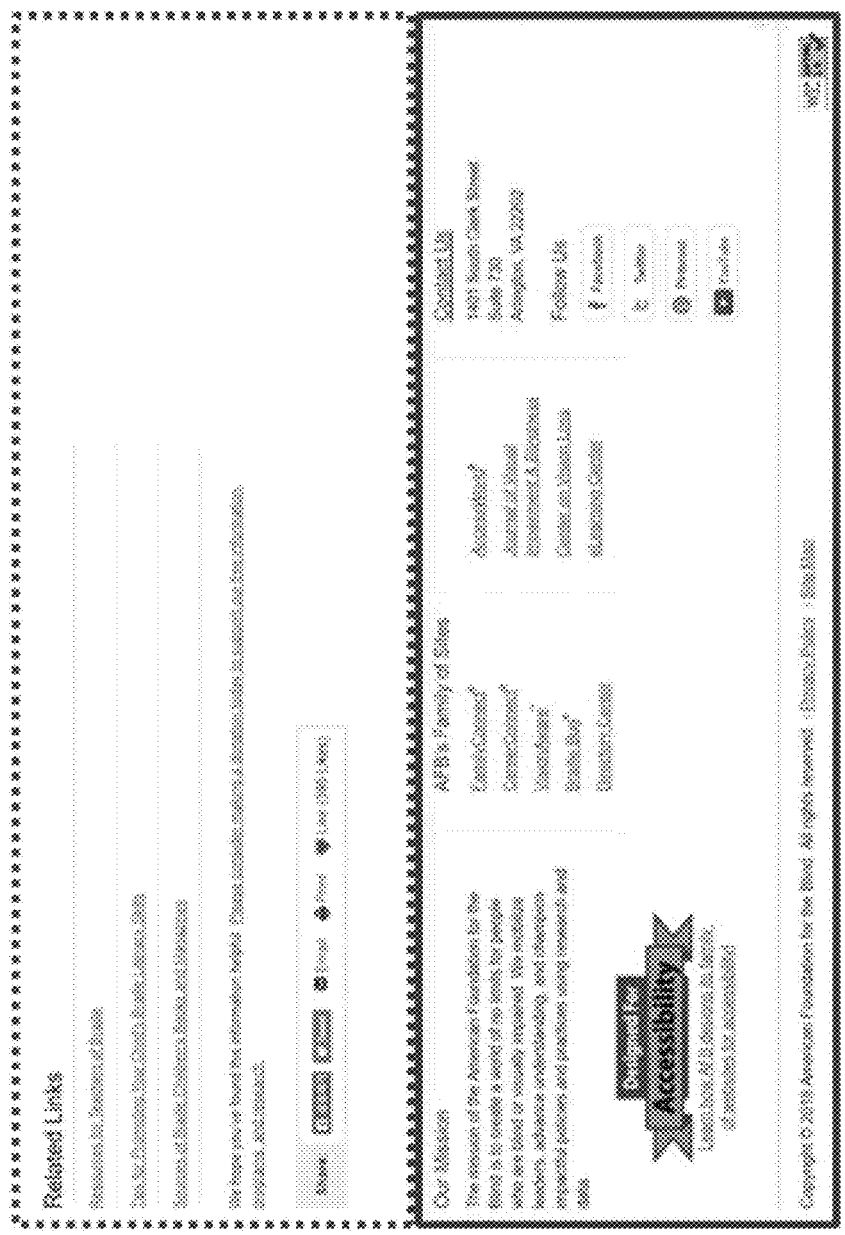

FIGS. 26A and 26B are views showing screens in which the text content of the web page is displayed on the browser through the web page conversion module according to an embodiment of the present invention.

FIG. 26A is a view showing a general web page, and FIG. 26B is a view showing a state in which the text of the web page is outputted as the contents of the internet browser module according to an embodiment of the present invention.

Although the region of interest is set to output the content of the region of interest as in FIG. 25, when it is necessary to confirm contents of areas other than the region of interest, the user may easily confirm the contents of other areas by changing the region of interest.

FIG. 26A is a view showing a bottom portion of the web page shown in FIG. 25A. The region of interest in FIG. 25A is indicated by a red box with dotted lines in FIG. 26A. At this time, the user may change the region of interest to an area indicated by the red box at a bottom through input of a direction key or the like so as to output a content of a newly set region of interest as shown in FIG. 26B.

Figure 27A:
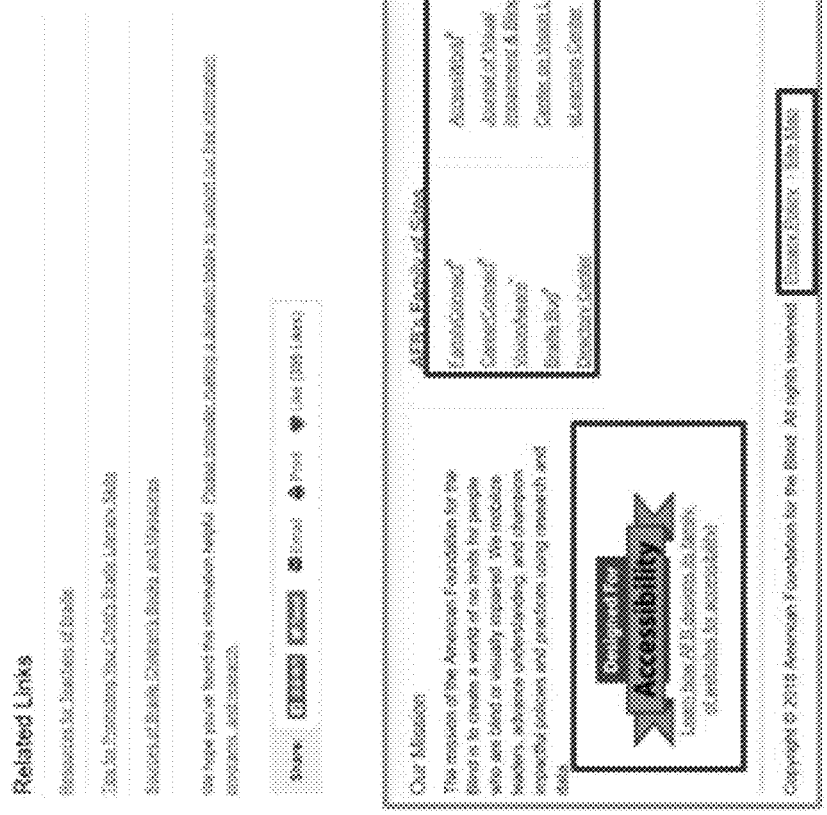
FIGS. 27A and 27B are views showing screens in which a link list of the web page is displayed on the browser through the web page conversion module according to an embodiment of the present invention.
Figure 27B:
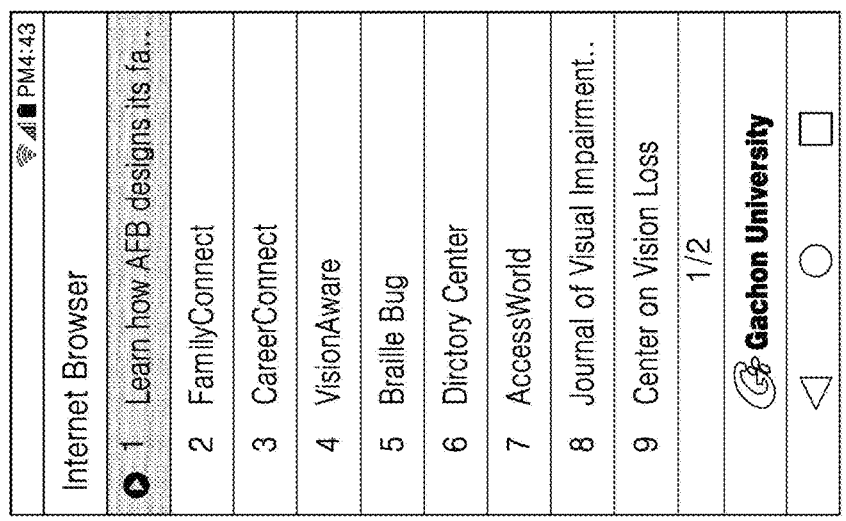

FIGS. 27A and 27B are views showing screens in which a link list of the web page is displayed on the browser through the web page conversion module according to an embodiment of the present invention.

FIG. 27A is a view showing a general web page, and FIG. 27B is a view showing a state in which the text of the web page is outputted as the contents of the internet browser module according to an embodiment of the present invention.

When the region of interest is changed to the area at the bottom as shown in FIG. 26, the newly set region of interest includes a plurality of link information (red boxes) as shown in FIG. 27A. At this time, the link list generation unit 5340 of the web page conversion module 5300 extracts links present in the area to generate a link list. The generated link list may be displayed on the screen as shown in FIG. 27B. Therefore, the user may select one link from the link list displayed as shown in FIG. 27B so as to easily move to a linked web page by using the link in the region of interest.

The above-mentioned device may be implemented by hardware components, software components, and/or a combination of the hardware components and the software components. For example, the devices and components described in the embodiments may be implemented by using at least one general purpose computer or special purpose computer such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. In some cases, one processing device is used for the further understanding. However, it will be appreciated by those skilled in the art that the processing device may include a plurality of processing elements and/or a plurality of types of processing elements. For example, the processing device may include a plurality of processors or one processor and one controller. In addition, other processing configurations, such as a parallel processor, may be possible.

The software may include a computer program, a code, and an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, computer storage media or device, or in a signal wave to be transmitted. The software may be distributed over computing devices connected to networks, thereby being stored or executed in a distributed manner.

The software and data may be stored in at least one computer-readable recording media.

The method according to the embodiment may be implemented in the form of a program instruction that may be executed through various computer mechanisms, thereby being recorded in a computer-readable medium. The computer-readable medium may include program instructions, data files, data structures, and the like, independently or in combination thereof. The program instructions recorded in the medium may be specially designed and configured for the embodiment, or may be known to those skilled in the art of computer software so as to be used. An example of the computer-readable medium includes a hard disk, a magnetic media such as a floppy disk and a magnetic tape, an optical media such as a CD-ROM and a DVD, a magneto-optical media such as a floptical disk, and a hardware device specially configured to store and execute a program instruction such as ROM, RAM, and flash memory. An example of the program instruction includes a high-level language code to be executed by a computer using an interpreter or the like, as well as a machine code generated by a compiler. The above hardware device may be configured to operate as at least one software module to perform the operations of the embodiments, and vice versa.

Although the above embodiments have been described with reference to the limited embodiments and drawings, however, it will be understood by those skilled in the art that various changes and modifications may be made from the above-mentioned description. For example, even though the described descriptions are performed in an order different from the described manner, and/or the described components such as system, structure, device, and circuit are coupled or combined in a form different from the described manner, or replaced or substituted by other components or equivalents, appropriate results may be achieved.

Therefore, other implementations, other embodiments, and equivalents to the claims are also within the scope of the following claims.

What is claimed is:

1. A method implemented by a system comprising a computing device including a processor configured to provide an internet browsing service, and a tactile interface device including a tactile screen, and configured to be connected to the computing device to interact with a user, the processor is further configured to convert information displayed as a visual graphic into a form which is displayed as a tactile graphic on the tactile interface device, display a predetermined browser main screen when an internet browsing application is executed, and convert information contained in a web page on internet into a form which is displayed by a visual display device connected to the computing device, the method comprising:

triggering, by the processor, execution of the internet browsing application in response to a detection of a connection of the tactile interface device to the computing device;

outputting, by the processor, information including the predetermined browser main screen to the visual display device connected to the computing device;

generating, by the processor, an output signal for implementing the tactile screen of the tactile interface device corresponding to a screen displayed on the display device based on the information including the predetermined browser main screen;

generating, by the processor, an input signal, which is to be inputted in response to the screen displayed based on the information including the predetermined browser main screen, from a user input inputted to the tactile interface device;

outputting, by the processor, information, which includes the information contained in the web page and converted by the processor, to the visual display device connected to the computing device;

generating, by the processor, an output signal for implementing the tactile screen of the tactile interface device corresponding to the screen displayed on the display device based on the information including the information contained in the web page and converted by the processor;

generating, by the processor, an input signal, which is to be inputted in response to the screen displayed based on the information including the information contained in the web page and converted by the processor from a user input inputted to the tactile interface device;

loading, by the processor, the web page from the internet;

classifying, by the processor, the loaded web page into a plurality of areas;

calculating, by the processor, a percentage of a number of texts and image tags included in a respective area of the classified plurality of areas with respect to a total number of texts and image tags in entire of the loaded web page;

obtaining, by the processor, an evaluation score of the respective area of the classified plurality of areas based on the calculated percentage, a higher evaluation score is obtained for the respective area of the classified plurality of areas as the calculated percentage of the respective area of the classified plurality of areas is higher;

selecting, by the processor, an interest area, which has a highest evaluation score among the classified plurality of areas; and generating, by the processor, an output signal including one or more contents of the interest area, for implementing the tactile screen to show the one or more contents of the interest area.

2. The method of claim 1, wherein the classifying the loaded web page into the plurality of areas comprises:
obtaining an HTML version of the web page by analyzing an HTML document of the web page; and
analyzing the web page based on an HTML5 standard and classify the plurality of areas when the HTML version of the web page is HTML5.

3. The method of claim 1, further comprising:
outputting, by the processor, information including a bookmark list, which is created by selection of the user and includes information on one or more specific web pages on the internet, to the visual display device connected to the computing device; and generating, by the processor, an output signal for implementing the tactile screen of the tactile interface device corresponding to a screen displayed on the display device based on the information including the bookmark list, and generating, by the processor, an input signal, which is to be inputted in response to the displayed information including the bookmark list, from a user input inputted to the tactile interface device.

4. The method of claim 3, further comprising:
adding, by the processor, the information contained in the web page and converted by the processor, to the bookmark list.

5. The method of claim 1, further comprising:
outputting, by the processor, information including a search engine list to the visual display device connected to the computing device; and
generating, by the processor, an output signal for implementing the tactile screen of the tactile interface device corresponding to a screen displayed based on the information including the search engine list, and generating, by the processor, an input signal, which is to be inputted in response to the displayed information including the search engine list, from a user input inputted to the tactile interface device.

6. The method of claim 5, further comprising:
inputting a search word to be searched into a search engine which is selected among the search engines included in the search engine list; and
generating, by the processor, an output signal for implementing the tactile screen of the tactile interface device corresponding to a screen displayed on the display device based on a result of the inputted search word, and generating, by the processor, an input signal, which is to be inputted in response to the result of the inputted search word, from a user input inputted to the tactile interface device,
wherein the search word is directly inputted by the user or is selected from a search word list including one or more search words.

7. A system comprising:
a computing device including a processor configured to provide an internet browsing service, and a tactile interface device including a tactile screen, and configured to be connected to the computing device to interact with a user, wherein
the processor is configured to:
convert
information displayed as a visual graphic into a form which is displayed as a tactile graphic on the tactile interface device;
display a predetermined browser main screen when an internet browsing application is executed; and
convert information contained in a web page on an internet into a form which is displayed by a visual display device connected to the computing device, and
the processor is further configured to:
trigger execution of the internet browsing application in response to a detection of a connection of the tactile interface device to the computing device;
output information including the predetermined browser main screen to the visual display device connected to the computing device;
generate an output signal for implementing the tactile screen of the tactile interface device corresponding to a screen displayed on the display device based on the information including predetermined browser main screen;
generate an input signal, which is to be inputted in response to the screen displayed based on the information including predetermined browser main screen, from a user input inputted to the tactile interface device;
output information, which includes the information contained in the web page and converted by the processor, to the visual display device connected to the computing device;
generate an output signal for implementing the tactile screen of the tactile interface device corresponding to the screen displayed on the display device based on the information including the information contained in the web page and converted by the processor;
generate an input signal, which is to be inputted in response to the screen displayed based on the information including the information contained in the web page and converted by the processor from a user input inputted to the tactile interface device;
load the web page from the internet;
classify the loaded web page into a plurality of areas;
calculate a percentage of a number of texts and image tags included in a respective area of the classified plurality of areas with respect to a total number of texts and image tags in entire of the loaded web page;
obtain an evaluation score of the respective area of the classified plurality of areas based on the calculated percentage, a higher evaluation score is obtained for the respective area of the classified plurality of areas as the calculated percentage of the respective area of the classified plurality of areas is higher;
select an interest area, which has a highest evaluation score among the classified plurality of areas; and
generate an output signal including one or more contents of the interest area, for implementing the tactile screen to show the one or more contents of the interest area.

8. A non-transitory computer-readable medium for controlling a tactile interface device including a tactile screen, and configured to be connected to a computing device to provide an internet browsing service to a visually impaired person, wherein the non-transitory computer-readable medium stores instructions for controlling a processor of the computing device to execute:
triggering execution of an internet browsing application in response to a detection of a connection of the tactile interface device to the computing device;
outputting information including a predetermined browser main screen to a visual display device connected to the computing device;
generating an output signal for implementing the tactile screen of the tactile interface device corresponding to a screen displayed on the display device based on the information including the predetermined browser main screen;
generating an input signal, which is to be inputted in response to the screen displayed based on the information including the predetermined browser main screen, from a user input inputted to the tactile interface device;

outputting information, which includes the information contained in the web page and converted by the processor, to the visual display device connected to the computing device;

generating an output signal for implementing the tactile screen of the tactile interface device corresponding to the screen displayed on the display device based on the information including the information contained in the web page and converted by the processor;

generating an input signal, which is to be inputted in response to the screen displayed based on the information including the information contained in the web page and converted by the processor from a user input inputted to the tactile interface device;

loading the web page from the internet;

classifying the loaded web page into a plurality of areas;

calculating a percentage of a number of texts and image tags included in a respective area of the classified plurality of areas with respect to a total number of texts and image tags in entire of the loaded web page;

obtaining an evaluation score of the respective area of the classified plurality of areas based on the calculated percentage, a higher evaluation score is obtained for the respective area of the classified plurality of areas as the calculated percentage of the respective area of the classified plurality of areas is higher;

selecting an interest area, which has a highest evaluation score among the classified plurality of areas; and generating an output signal including one or more contents of the interest area, for implementing the tactile screen to show the one or more contents of the interest area.

\* \* \* \* \*